(12) United States Patent
Porat et al.

(10) Patent No.: US 9,113,490 B2
(45) Date of Patent: Aug. 18, 2015

(54) SHORT TRAINING FIELD (STF) FOR USE WITHIN SINGLE USER, MULTIPLE USER, MULTIPLE ACCESS, AND/OR MIMO WIRELESS COMMUNICATIONS

(75) Inventors: Ron Porat, San Diego, CA (US); Jun Zheng, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 138 days.

(21) Appl. No.: 13/454,021

(22) Filed: Apr. 23, 2012

(65) Prior Publication Data

US 2012/0269125 A1 Oct. 25, 2012

Related U.S. Application Data

(60) Provisional application No. 61/478,537, filed on Apr. 24, 2011, provisional application No. 61/493,577, filed on Jun. 6, 2011, provisional application No. 61/496,153, filed on Jun. 13, 2011, provisional (Continued)

(51) Int. Cl.
*H04L 27/26* (2006.01)
*H04W 72/12* (2009.01)
*H04W 84/12* (2009.01)

(52) U.S. Cl.
CPC ....... *H04W 72/1231* (2013.01); *H04L 27/2602* (2013.01); *H04L 27/2613* (2013.01); *H04L 27/2666* (2013.01); *H04W 84/12* (2013.01); *Y02B 60/50* (2013.01)

(58) Field of Classification Search
USPC ......... 370/328, 329, 338, 312, 310, 474, 252, 370/349, 476; 455/39
See application file for complete search history.

(56) References Cited

U.S. PATENT DOCUMENTS

| | | | |
|---|---|---|---|
| 5,949,796 A * | 9/1999 | Kumar .......................... | 370/529 |
| 6,005,894 A * | 12/1999 | Kumar .......................... | 375/270 |
| 6,947,748 B2 * | 9/2005 | Li et al. ........................ | 455/450 |
| 7,675,984 B1 * | 3/2010 | Carbone et al. ............... | 375/260 |
| 7,746,766 B2 * | 6/2010 | Kowalski et al. ............. | 370/208 |
| 7,751,490 B2 * | 7/2010 | Popovic ........................ | 375/260 |
| 8,090,037 B1 * | 1/2012 | Harris et al. .................. | 375/260 |
| 8,170,160 B1 * | 5/2012 | Shi ................................ | 375/347 |
| 8,175,119 B2 * | 5/2012 | Zhang et al. .................. | 370/474 |
| 2001/0055320 A1 * | 12/2001 | Pierzga et al. ................ | 370/480 |

(Continued)

OTHER PUBLICATIONS

Popovic, B.P.; Class of binary sequences for mobile channel estimation; Electronics Letters(1995),31(12):944.*

(Continued)

*Primary Examiner* — Benjamin H Elliott, IV
*Assistant Examiner* — Eric Nowlin
(74) *Attorney, Agent, or Firm* — Garlick & Markison; Shayne X. Short

(57) ABSTRACT

Short training field (STF) for use within single user, multiple user, multiple access, and/or MIMO wireless communications. An STF design as is made such that the power associated with the tone indices at the edges of the STF design is relatively less than the power associated with the tone indices more centrally located within the STF design. Also, when multiple respective operational modes are supported (e.g., 1 MHz and 2 MHz), the respective STF designs corresponding to those respective operational modes have a great deal of similarity. For example, the respective STF designs for different respective operational modes may have certain common STF tone indices among those respective STF designs.

20 Claims, 22 Drawing Sheets

Related U.S. Application Data application No. 61/501,239, filed on Jun. 26, 2011, provisional application No. 61/507,955, filed on Jul. 14, 2011, provisional application No. 61/512,363, filed on Jul. 27, 2011, provisional application No. 61/522,608, filed on Aug. 11, 2011, provisional application No. 61/542,602, filed on Oct. 3, 2011, provisional application No. 61/561,722, filed on Nov. 18, 2011, provisional application No. 61/577,597, filed on Dec. 19, 2011, provisional application No. 61/584,142, filed on Jan. 6, 2012, provisional application No. 61/592,514, filed on Jan. 30, 2012, provisional application No. 61/595,616, filed on Feb. 6, 2012, provisional application No. 61/598,293, filed on Feb. 13, 2012, provisional application No. 61/602,504, filed on Feb. 23, 2012.

(56) References Cited

U.S. PATENT DOCUMENTS

| | | | | |
|---|---|---|---|---|
| 2002/0114270 | A1* | 8/2002 | Pierzga et al. | 370/208 |
| 2004/0179627 | A1* | 9/2004 | Ketchum et al. | 375/267 |
| 2004/0252631 | A1* | 12/2004 | Park | 370/210 |
| 2004/0252774 | A1* | 12/2004 | Park | 375/260 |
| 2005/0094550 | A1* | 5/2005 | Huh et al. | 370/203 |
| 2005/0169411 | A1* | 8/2005 | Kroeger | 375/350 |
| 2006/0280266 | A1* | 12/2006 | Li | 375/340 |
| 2006/0291431 | A1* | 12/2006 | Pajukoski et al. | 370/335 |
| 2007/0064591 | A1* | 3/2007 | Nakao | 370/208 |
| 2007/0064592 | A1* | 3/2007 | Nakao | 370/208 |
| 2007/0064645 | A1* | 3/2007 | Tanaka et al. | 370/329 |
| 2007/0064687 | A1* | 3/2007 | Nakao | 370/358 |
| 2007/0064822 | A1* | 3/2007 | Nakao | 375/260 |
| 2007/0076581 | A1* | 4/2007 | Tanaka | 370/203 |
| 2007/0076582 | A1* | 4/2007 | Tanaka et al. | 370/203 |
| 2007/0081602 | A1* | 4/2007 | Tanaka et al. | 375/260 |
| 2007/0253499 | A1* | 11/2007 | Waters et al. | 375/260 |
| 2008/0063118 | A1* | 3/2008 | Li | 375/340 |
| 2010/0082722 | A1* | 4/2010 | Sinnokrot et al. | 708/404 |
| 2011/0026623 | A1* | 2/2011 | Srinivasa et al. | 375/260 |
| 2011/0051747 | A1* | 3/2011 | Schmidl et al. | 370/474 |
| 2011/0116383 | A1* | 5/2011 | Lipka | 370/241 |
| 2011/0211594 | A1* | 9/2011 | Van Nee | 370/475 |

OTHER PUBLICATIONS

Budisin, S., Decimation Generator of Zadoff-Chu Sequences, Sequences and Their Applications—SETA 2010 Lecture Notes in Computer Science vol. 6338, 2010, pp. 30-40.*

Lee, "A Comparative Study of Wireless Protocols: Bluetooth, UWB, Zigbee, and Wi-Fi", Nov. 5-8, 2007, Industrial Electronics Society, 2007. IECON 2007. 33rd Annual Conference of the IEEE.*

Fazel et al., "Multi-Carrier and Spread Spectrum Systems"; 2003, Wiley, ISBN 0-470-84899-5.*

Han et al., An Overview of Peak-to-Average Power Ratio Reduction Techniques for Multicarrier Transmission, Apr. 18, 2005, IEEE Wireless Communications, Volumne 12, Issue 12, p. 56-65.*

* cited by examiner

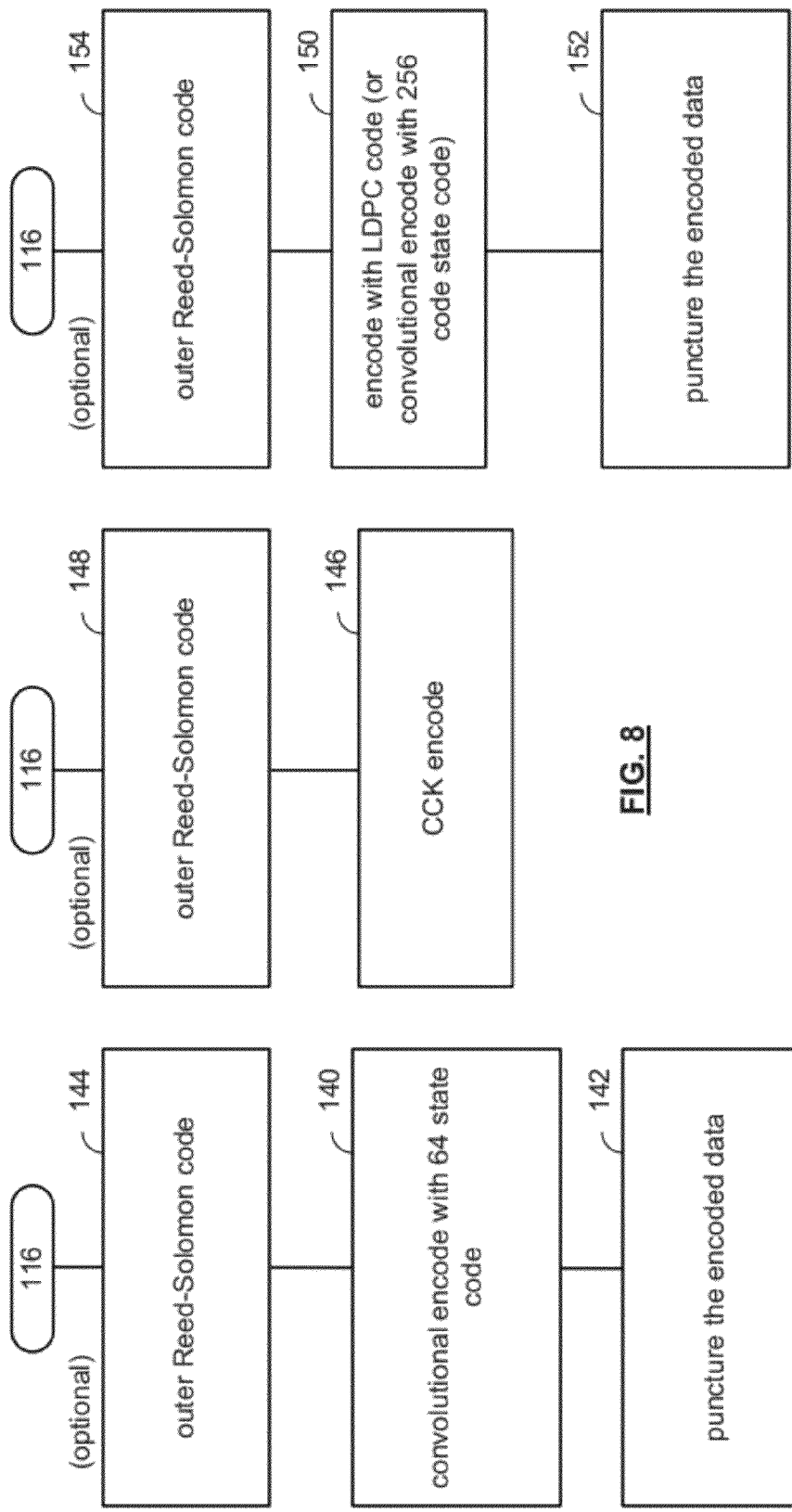

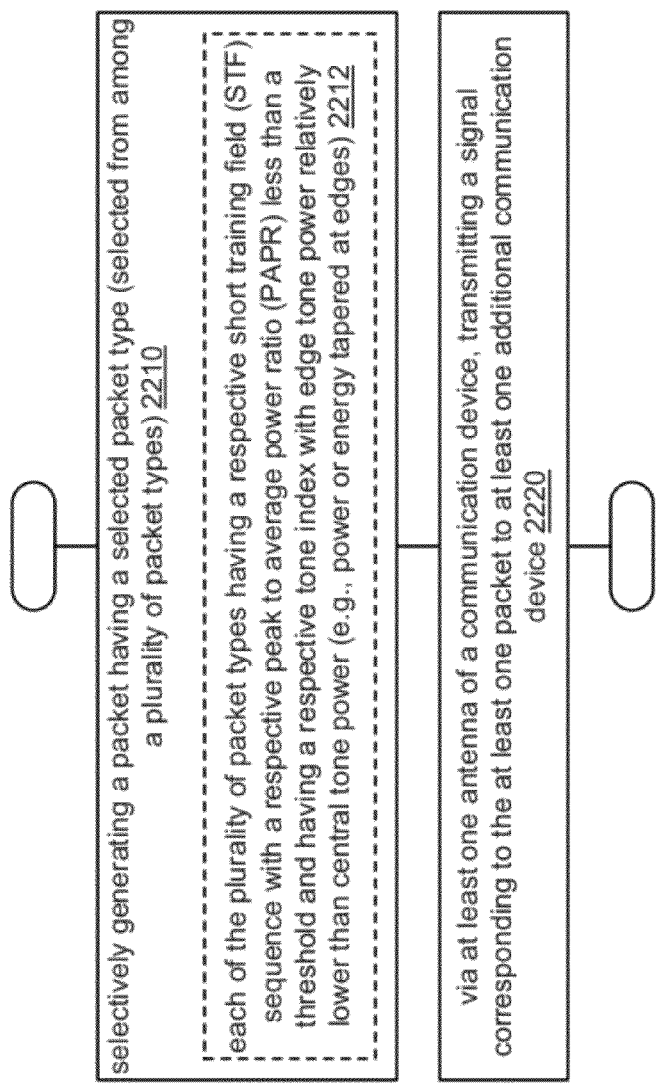

SHORT TRAINING FIELD (STF) FOR USE WITHIN SINGLE USER, MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Patent Application Ser. No. 61/478,537, entitled "Preamble for use within multiple user, multiple access, and/or MIMO wireless communications,", filed Apr. 24, 2011.
2. U.S. Provisional Patent Application Ser. No. 61/493,577, entitled "Preamble for use within multiple user, multiple access, and/or MIMO wireless communications,", filed Jun. 6, 2011.
3. U.S. Provisional Patent Application Ser. No. 61/496,153, entitled "Preamble for use within multiple user, multiple access, and/or MIMO wireless communications,", filed Jun. 13, 2011.
4. U.S. Provisional Patent Application Ser. No. 61/501,239, entitled "Preamble for use within multiple user, multiple access, and/or MIMO wireless communications,", filed Jun. 26, 2011.
5. U.S. Provisional Patent Application Ser. No. 61/507,955, entitled "Preamble for use within multiple user, multiple access, and/or MIMO wireless communications,", filed Jul. 14, 2011.
6. U.S. Provisional Patent Application Ser. No. 61/512,363, entitled "Preamble for use within multiple user, multiple access, and/or MIMO wireless communications,", filed Jul. 27, 2011.
7. U.S. Provisional Patent Application Ser. No. 61/522,608, entitled "Preamble for use within multiple user, multiple access, and/or MIMO wireless communications,", filed Aug. 11, 2011.
8. U.S. Provisional Patent Application Ser. No. 61/542,602, entitled "Preamble for use within single user, multiple user, multiple access, and/or MIMO wireless communications,", filed Oct. 3, 2011.
9. U.S. Provisional Patent Application Ser. No. 61/561,722, entitled "Preamble for use within single user, multiple user, multiple access, and/or MIMO wireless communications,", filed Nov. 18, 2011.
10. U.S. Provisional Patent Application Ser. No. 61/577,597, entitled "Preamble for use within single user, multiple user, multiple access, and/or MIMO wireless communications,", filed Dec. 19, 2011.
11. U.S. Provisional Patent Application Ser. No. 61/584,142, entitled "Preamble for use within single user, multiple user, multiple access, and/or MIMO wireless communications,", filed Jan. 6, 2012.
12. U.S. Provisional Patent Application Ser. No. 61/592,514, entitled "Preamble for use within single user, multiple user, multiple access, and/or MIMO wireless communications,", filed Jan. 30, 2012.
13. U.S. Provisional Patent Application Ser. No. 61/595,616, entitled "Preamble for use within single user, multiple user, multiple access, and/or MIMO wireless communications,", filed Feb. 6, 2012.
14. U.S. Provisional Patent Application Ser. No. 61/598,293, entitled "Preamble for use within single user, multiple user, multiple access, and/or MIMO wireless communications,", filed Feb. 13, 2012.
15. U.S. Provisional Patent Application Ser. No. 61/602,504, entitled "Preamble for use within single user, multiple user, multiple access, and/or MIMO wireless communications,", filed Feb. 23, 2012.

INCORPORATION BY REFERENCE

The following U.S. Utility Patent Applications are hereby incorporated herein by reference in their entirety and made part of the present U.S. Utility Patent Application for all purposes:

1. U.S. Utility patent application Ser. No. 13/453,703, entitled "Preamble for use within single user, multiple user, multiple access, and/or MIMO wireless communications,", filed concurrently on Apr. 23, 2012, pending.
2. U.S. Utility patent application Ser. No. 13/453,998, entitled "Doppler adaptation using pilot patterns within single user, multiple user, multiple access, and/or MIMO wireless communications,", filed concurrently on Apr. 23, 2012, pending.
3. U.S. Utility patent application Ser. No. 13/454,010, entitled "Long training field (LTF) for use within single user, multiple user, multiple access, and/or MIMO wireless communications,", filed concurrently on Apr. 23, 2012, pending.
4. U.S. Utility patent application Ser. No. 13/454,033, entitled "Device coexistence within single user, multiple user, multiple access, and/or MIMO wireless communications,", filed concurrently on Apr. 23, 2012, pending.

INCORPORATION BY REFERENCE

The following IEEE standards/draft IEEE standards are hereby incorporated herein by reference in their entirety and are made part of the present U.S. Utility Patent Application for all purposes:

1. IEEE Std 802.11™-2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, Sponsored by the LAN/MAN Standards Committee, IEEE Std 802.11™-2012, (Revision of IEEE Std 802.11-2007), 2793 total pages (incl. pp. i-xcvi, 1-2695).
2. IEEE Std 802.11n™-2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™-2009, (Amendment to IEEE Std 802.11™-2007 as amended by IEEE Std 802.11k™-2008, IEEE Std 802.11r™-2008, IEEE Std 802.11y™-2008, and IEEE Std 802.11r™-2009), 536 total pages (incl. pp. i-xxxii, 1-502).
3. IEEE Draft P802.11-REVmb™/D12, November 2011 (Revision of IEEE Std 802.11™-2007 as amended by IEEE Std 802.11k™-2008, IEEE Std 802.11r™-2008, IEEE Std 802.11y™-2008, IEEE Std 802.11w™-2009, IEEE Std 802.11n™-2009, IEEE Std 802.11p™-2010, IEEE Std 802.11z™-2010, IEEE Std 802.11v™-2011, IEEE Std 802.11u™-2011, and IEEE Std 802.11s™-2011), "IEEE Standard for Information technology—Telecommunications and information exchange between systems—Local and metropolitan area networks—Specific requirements; Part 11: Wireless LAN Medium Access Control (MAC) and Physical Layer (PHY) Specifications," Prepared by the 802.11 Working Group of the LAN/MAN Standards Committee of the IEEE Computer Society, 2910 total pages (incl. pp. i-cxxviii, 1-2782).

4. IEEE P802.11ac™/D2.1, March 2012, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz," Prepared by the 802.11 Working Group of the 802 Committee, 363 total pages (incl. pp. i-xxv, 1-338).

5. IEEE P802.11ad™/D6.0, March 2012, (Draft Amendment based on IEEE P802.11REVmb D12.0), (Amendment to IEEE P802.11REVmb D12.0 as amended by IEEE 802.11ae D8.0 and IEEE 802.11aa D9.0), "IEEE P802.11ad™/D6.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band," Sponsor: IEEE 802.11 Committee of the IEEE Computer Society, IEEE-SA Standards Board, 664 total pages.

6. IEEE Std 802.11ae™-2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," "Amendment 1: Prioritization of Management Frames," IEEE Computer Society, Sponsored by the LAN/MAN Standards Committee, IEEE Std 802.11ae™-2012, (Amendment to IEEE Std 802.11™-2012), 52 total pages (incl. pp. i-xii, 1-38).

7. IEEE P802.11af™/D1.06, March 2012, (Amendment to IEEE Std 802.11REVmb™/D12.0 as amended by IEEE Std 802.11ae™/D8.0, IEEE Std 802.11aa™/D9.0, IEEE Std 802.11ad™/D5.0, and IEEE Std 802.11ac™/D2.0), "Draft Standard for Information Technology—Telecommunications and information exchange between systems—Local and metropolitan area networks—Specific requirements—Part 11: Wireless LAN Medium Access Control (MAC) and Physical Layer (PHY) Specifications—Amendment 5: TV White Spaces Operation," Prepared by the 802.11 Working Group of the IEEE 802 Committee, 140 total pages (incl. pp. i-xxii, 1-118).

BACKGROUND OF THE INVENTION

1. Technical Field of the Invention

The invention relates generally to communication systems; and, more particularly, it relates to effectuating long range and low rate wireless communications within such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF DESCRIPTION OF THE SEVERAL VIEWS OF THE DRAWINGS

FIGS. 7-9 are diagrams illustrating various embodiments for encoding the scrambled data.

FIG. 22 illustrates an embodiment of a method for operating one or more wireless communication devices.

DETAILED DESCRIPTION OF THE INVENTION

Figure 1:
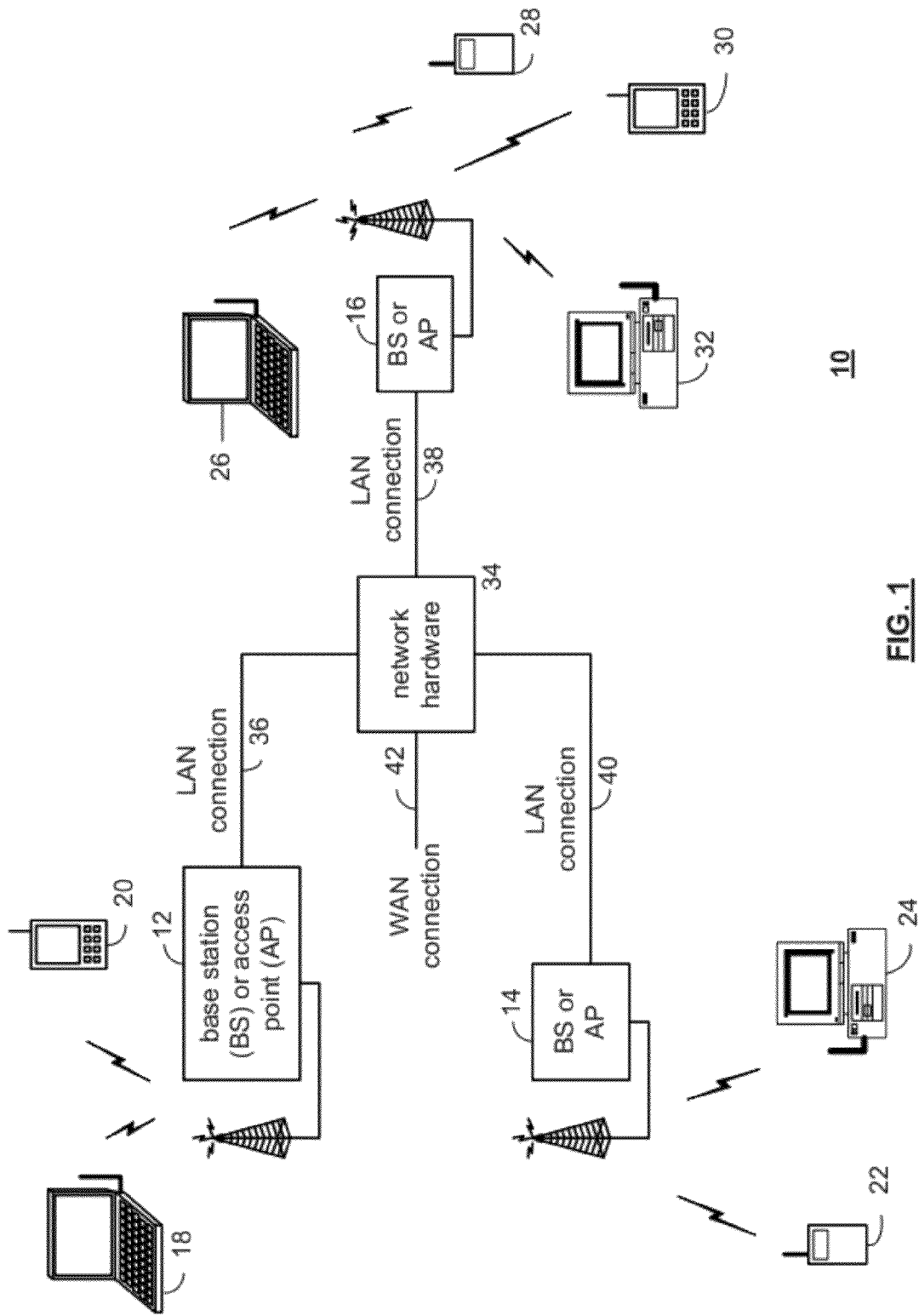
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices are described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various aspects of the invention as presented herein to enhance performance, reduce costs, reduce size, and/or enhance broadband applications.

Figure 2:
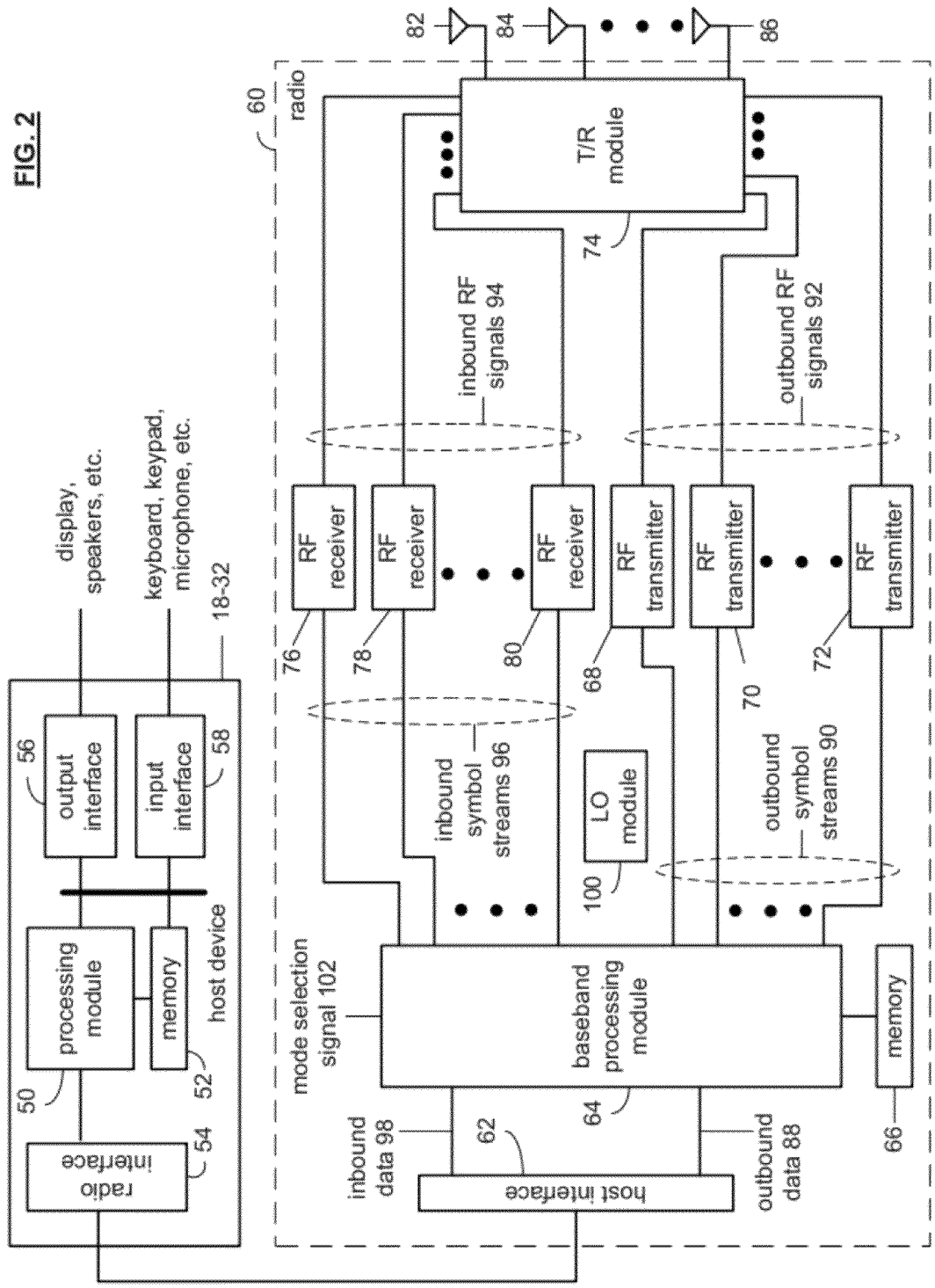
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per sub-carrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 64 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams. The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
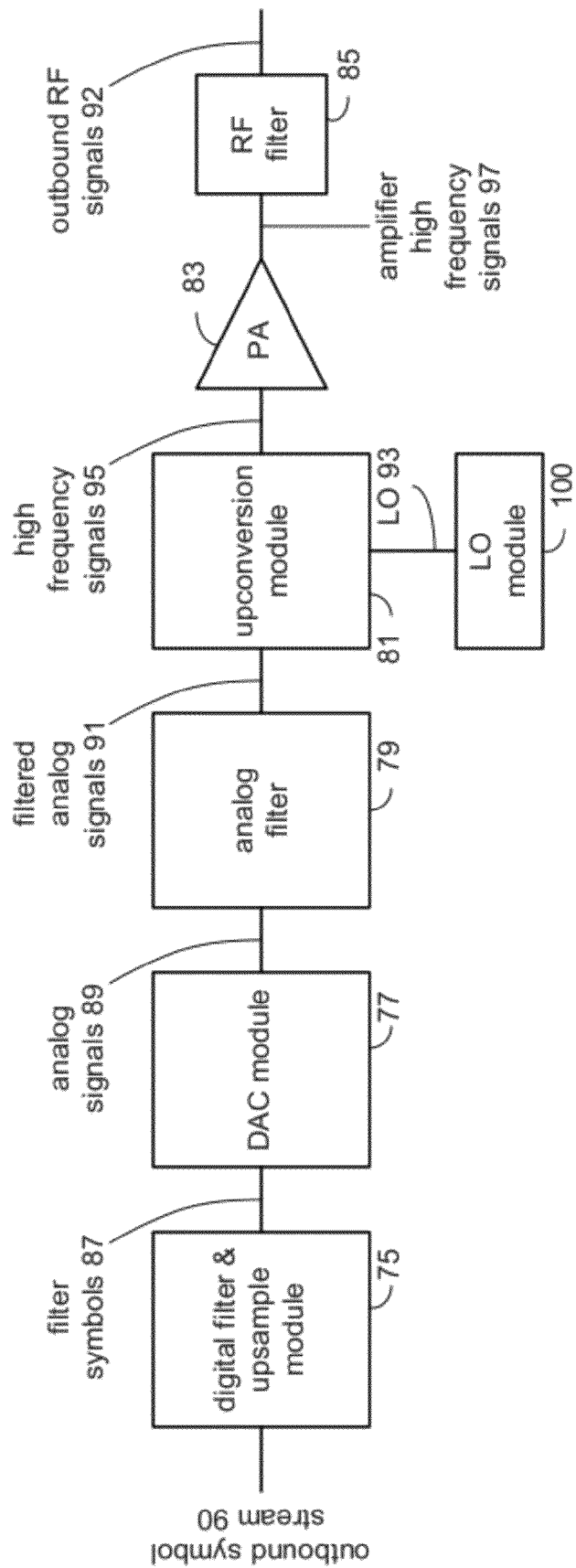
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the outbound RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
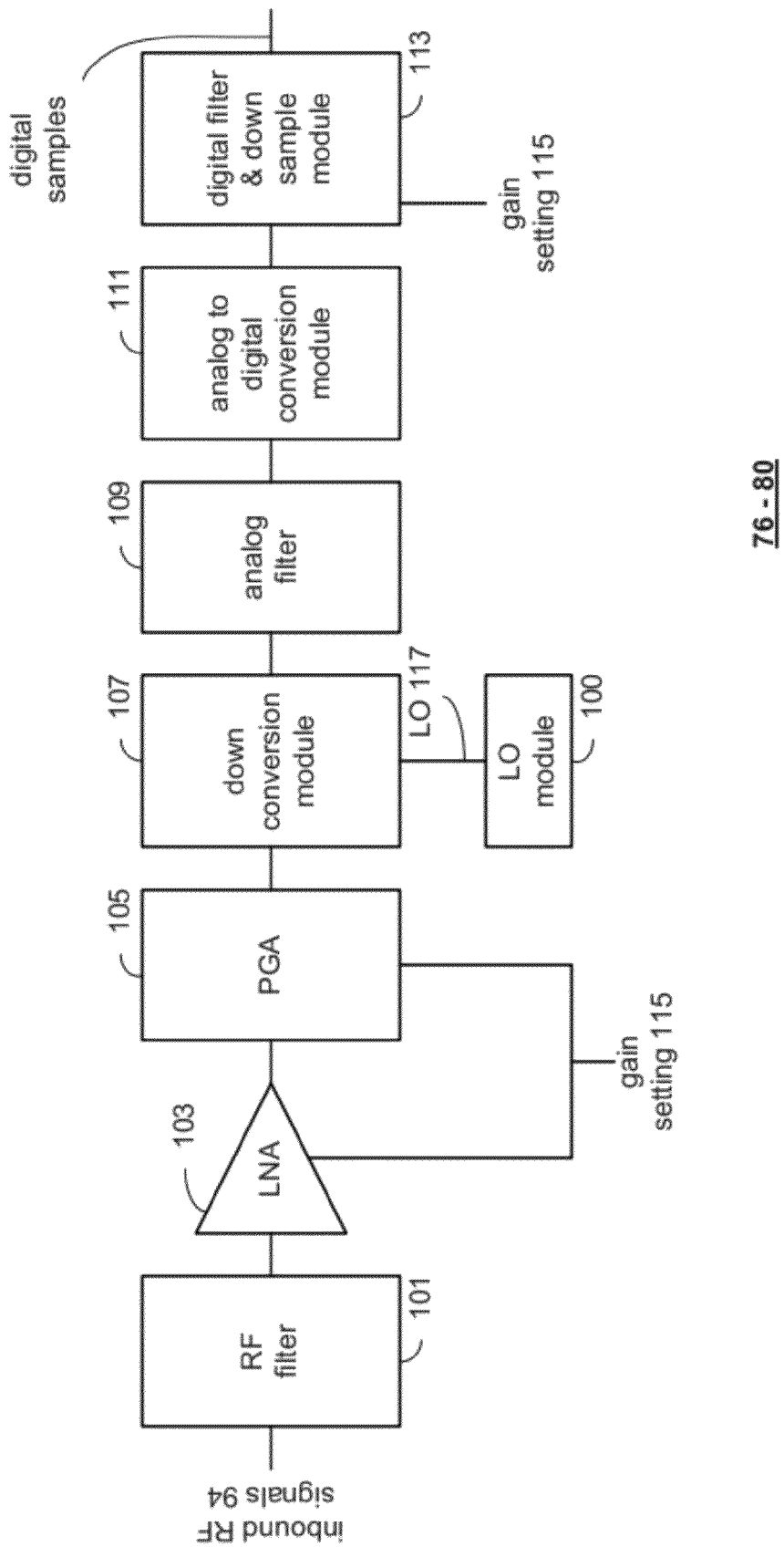
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency bandpass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
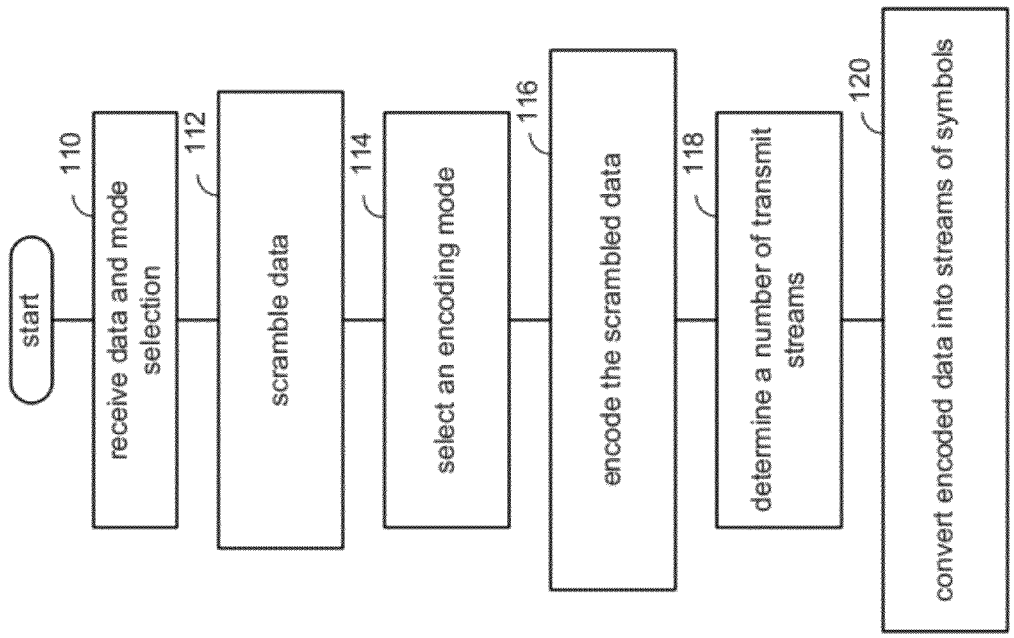
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
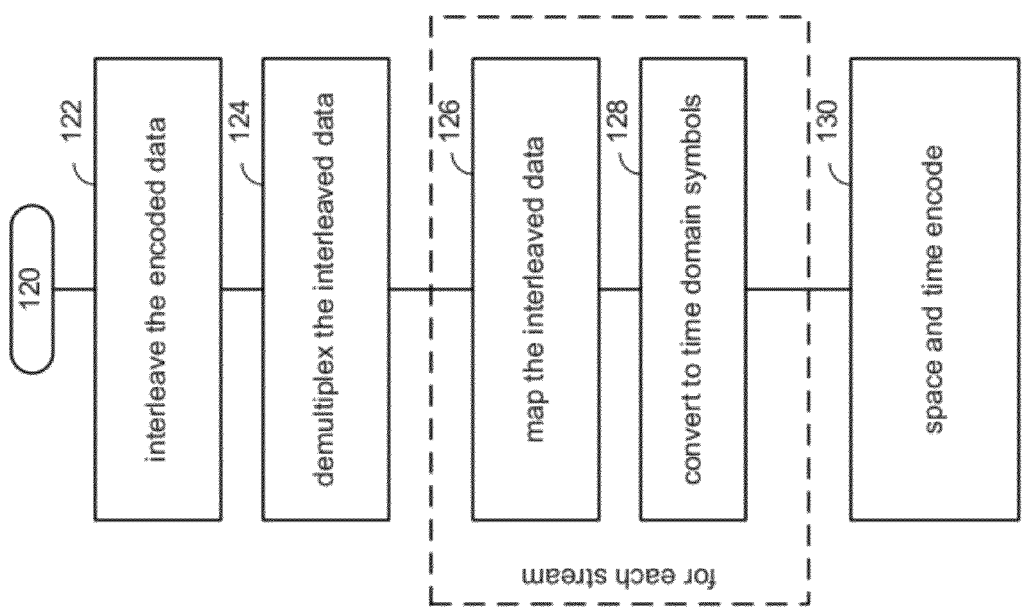
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and sub-carriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M. In one embodiment the encoding matrix may comprise a form of:

$$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include ½, ⅔ and/or ¾, or any rate as specified in tables 1-12. Note that, for a particular, mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
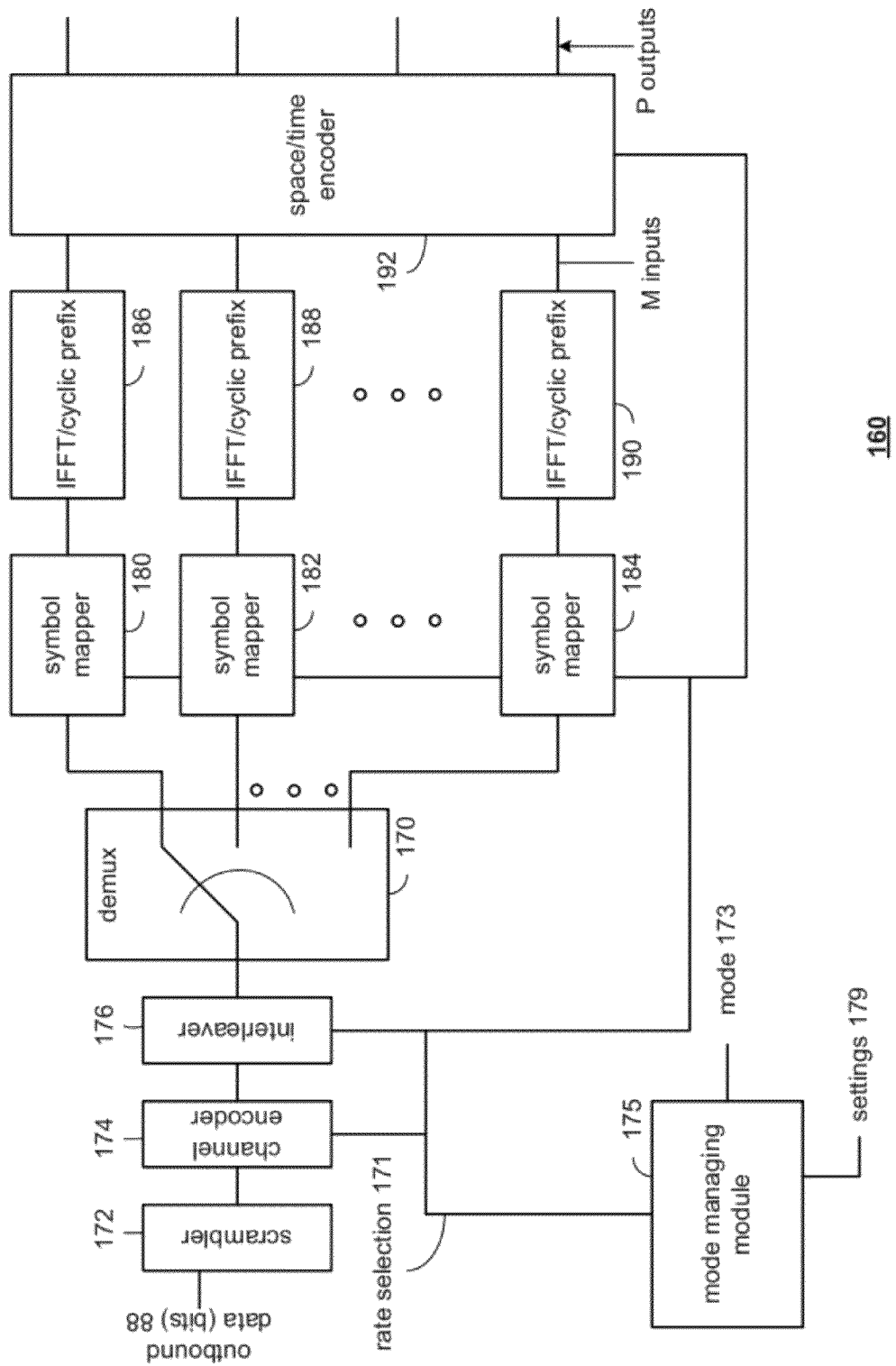
FIGS. 10A and 10B are diagrams illustrating embodiments of a radio transmitter.
Figure 10B:
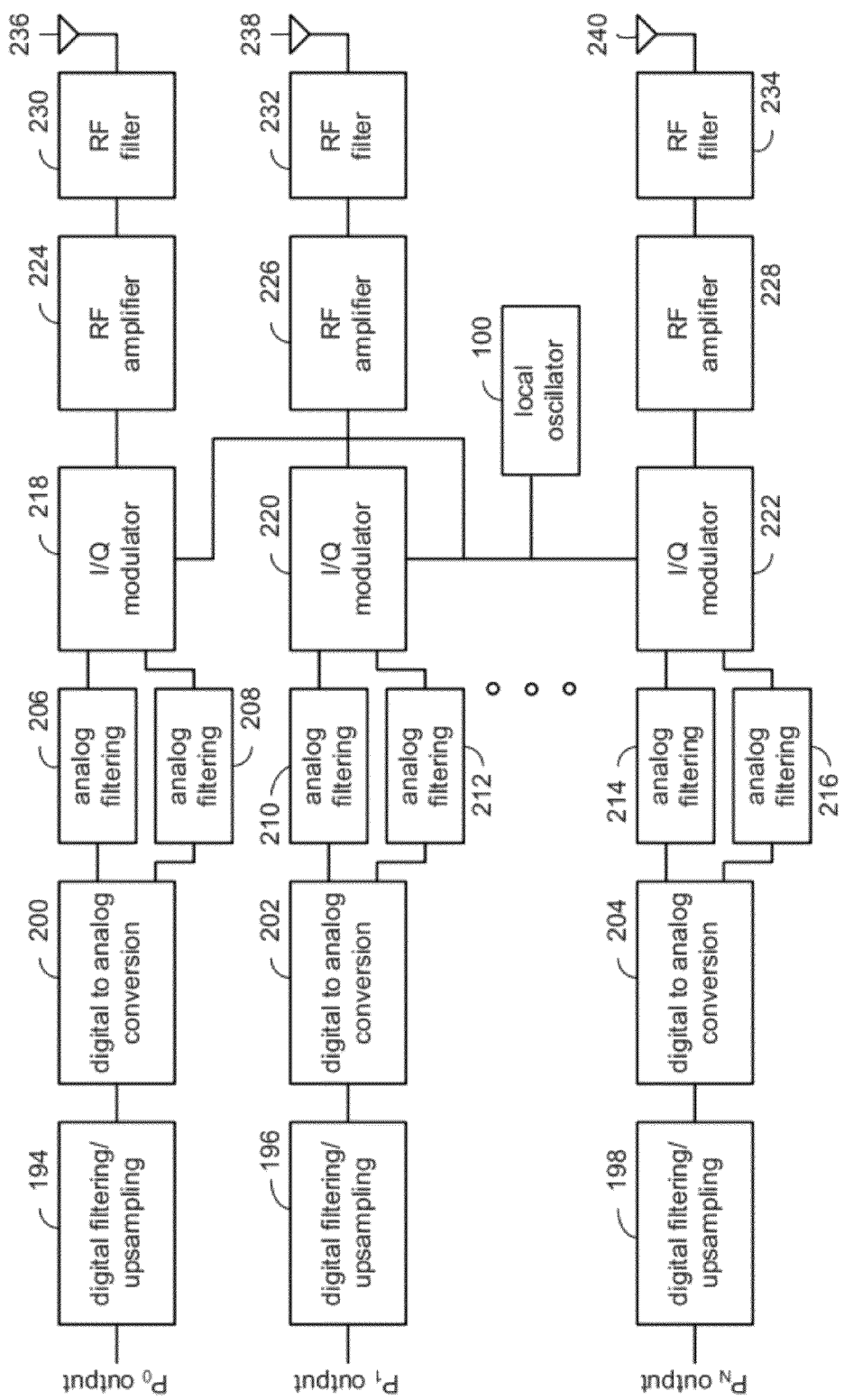

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 170, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleaver 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔, and ¾ according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 170 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, etc.) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} c_1 & c_2 & c_3 & c_4 & \ldots & c_{2M-1} & c_{2M} \\ -c_2^* & c_1^* & -c_4^* & c_3^* & \ldots & -c_{2M}^* & c_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 206-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
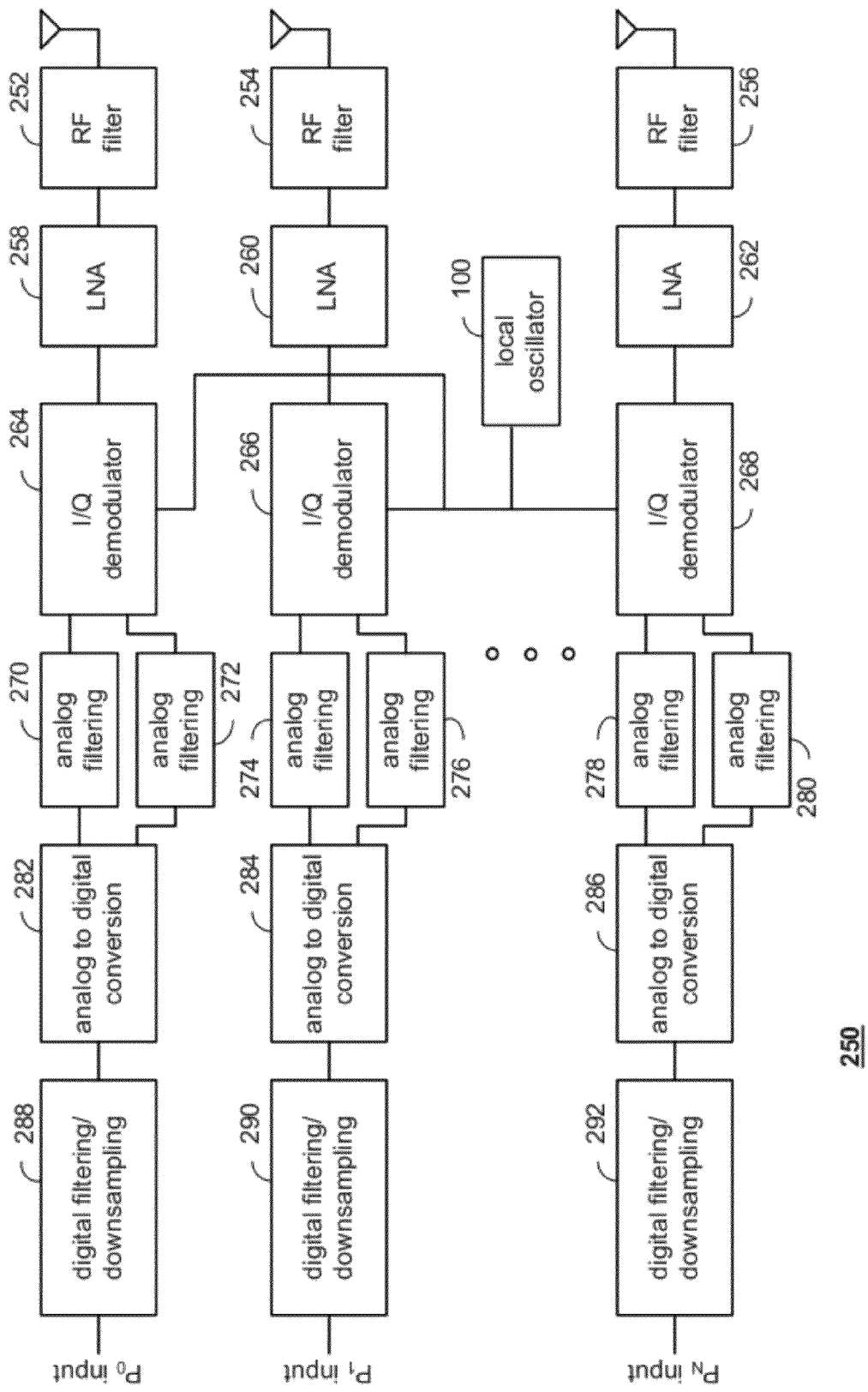
FIGS. 11A and 11B are diagrams illustrating embodiments of a radio receiver.
Figure 11B:
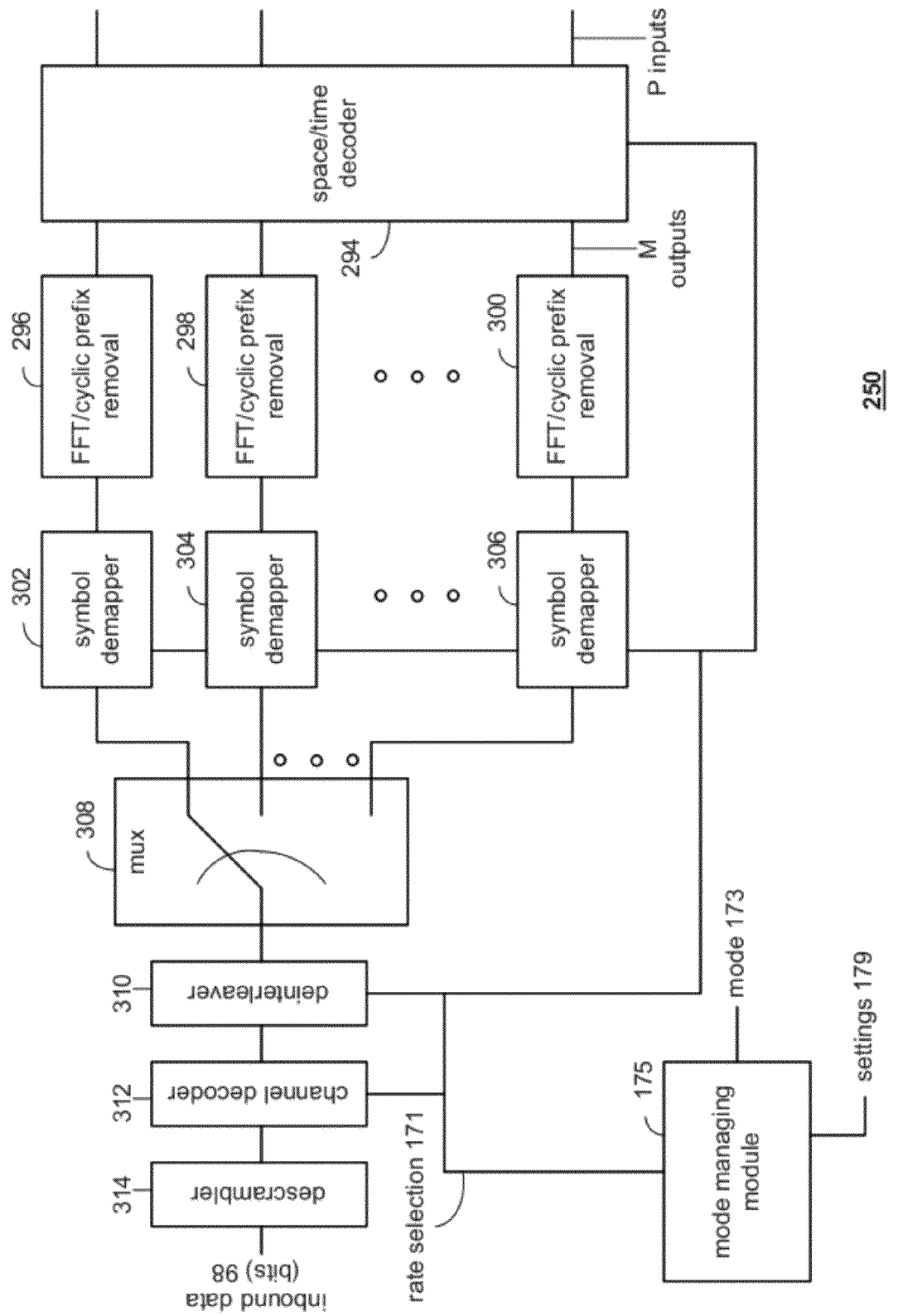

FIGS. 11A and 11B are diagrams illustrating embodiments of a radio receiver (as shown by reference numeral 250). These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-262, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-262 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
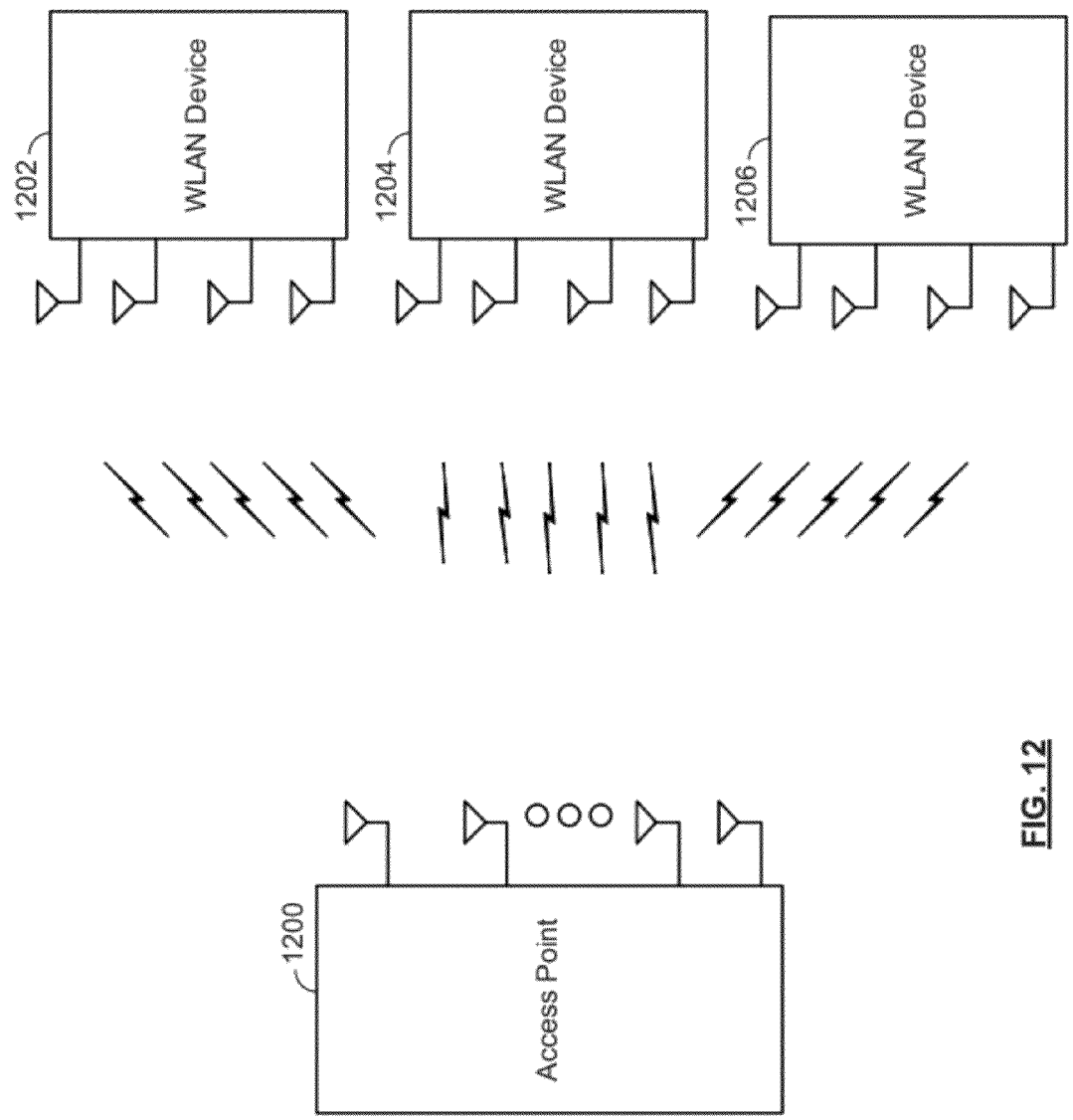
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11(a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of set of information transmitted to one or more receivers simultaneously in the time domain. Again, an OFDMA transmission sent to one user is equivalent to an OFDM transmission (e.g., OFDM may be viewed as being a subset of OFDMA). A single MU-MIMO transmission may include spatially-diverse signals over a common set of tones, each containing distinct information and each transmitted to one or more distinct receivers. Some single transmissions may be a combination of OFDMA and MU-MIMO. Multi-user (MU), as described herein, may be viewed as being multiple users sharing at least one cluster (e.g., at least one channel within at least one band) at a same time.

MIMO transceivers illustrated may include SISO, SIMO, and MISO transceivers. The clusters employed for such communications (e.g., OFDMA communications) may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments. Such a MU-MIMO/OFDMA transmitter (e.g., an AP or a STA) may transmit packets to more than one receiving wireless communication device (e.g., STA) on the same cluster (e.g., at least one channel within at least one band) in a single aggregated packet (such as being time multiplexed). In such an instance, channel training may be required for all communication links to the respective receiving wireless communication devices (e.g., STAs).

Figure 13:
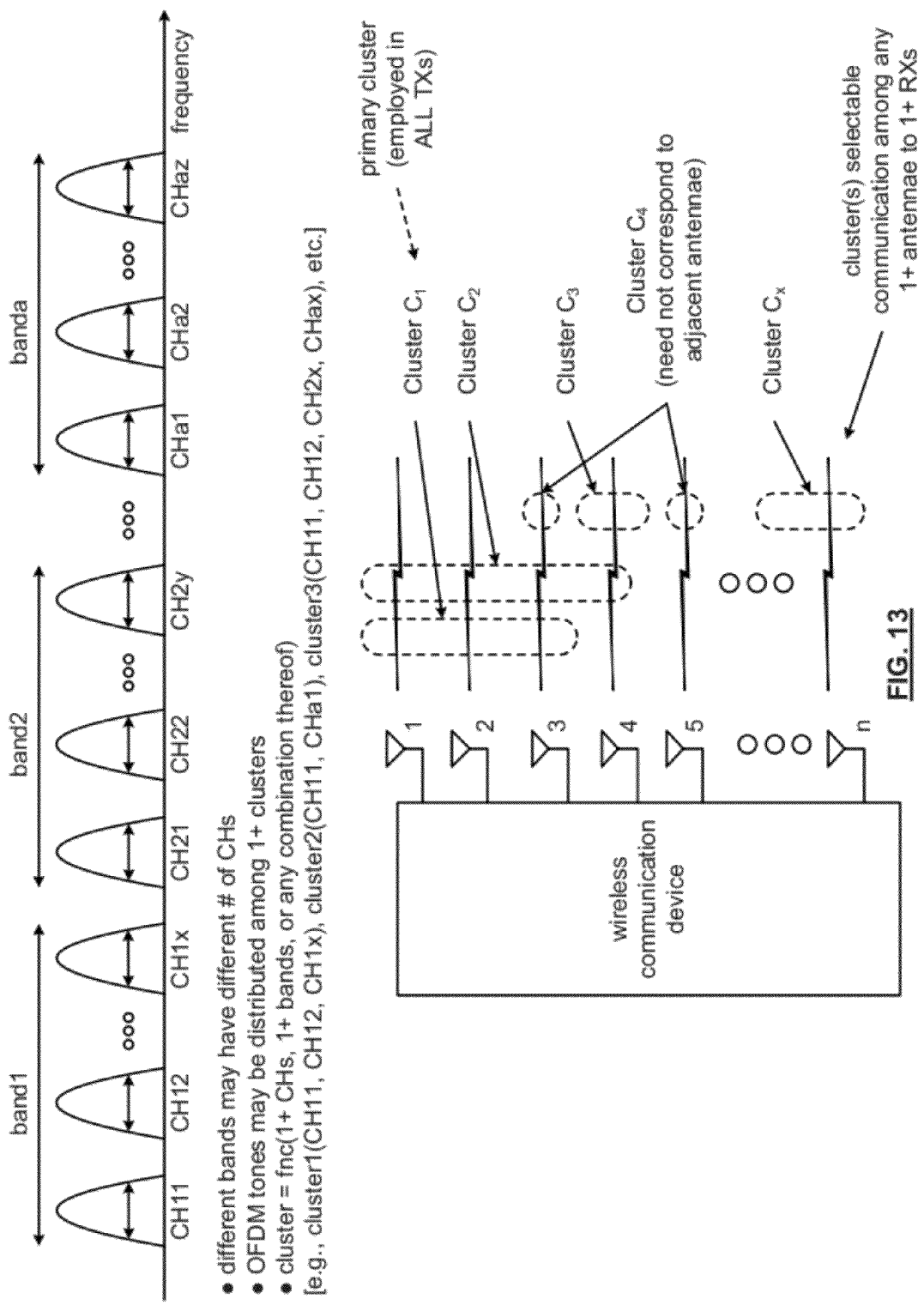
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Also, it is noted that, with respect to certain embodiments, general nomenclature may be employed wherein a transmitting wireless communication device (e.g., such as being an Access point (AP), or a wireless station (STA) operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications. Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system. Generally speaking, such capability, functionality, operations, etc. as described herein may be applied to any wireless communication device.

Various aspects and principles, and their equivalents, of the invention as presented herein may be adapted for use in various standards, protocols, and/or recommended practices (including those currently under development) such as those in accordance with IEEE 802.11x (e.g., where x is a, b, g, n, ac, ad, ae, af, ah, etc.).

For example, the IEEE 802.11ah is a new protocol/standard currently under development and is intended for long range and low rate applications operating in worldwide spectrum below 1 GHz. The available spectrum in each country differs and requires flexible design to accommodate different options. As such, modifications to the IEEE 802.11 standards, protocols, and/or recommended practices may be made to effectuate longer delay spread and lower data rate applications such as may be employed in accordance with the IEEE 802.11 ah developing standard.

Herein, from certain perspectives, certain adaptation and/or modification may be made with respect to IEEE 802.11ac standards, protocols, and/or recommended practices to provide efficient support for longer delay spread and lower data rate applications.

Figure 14:
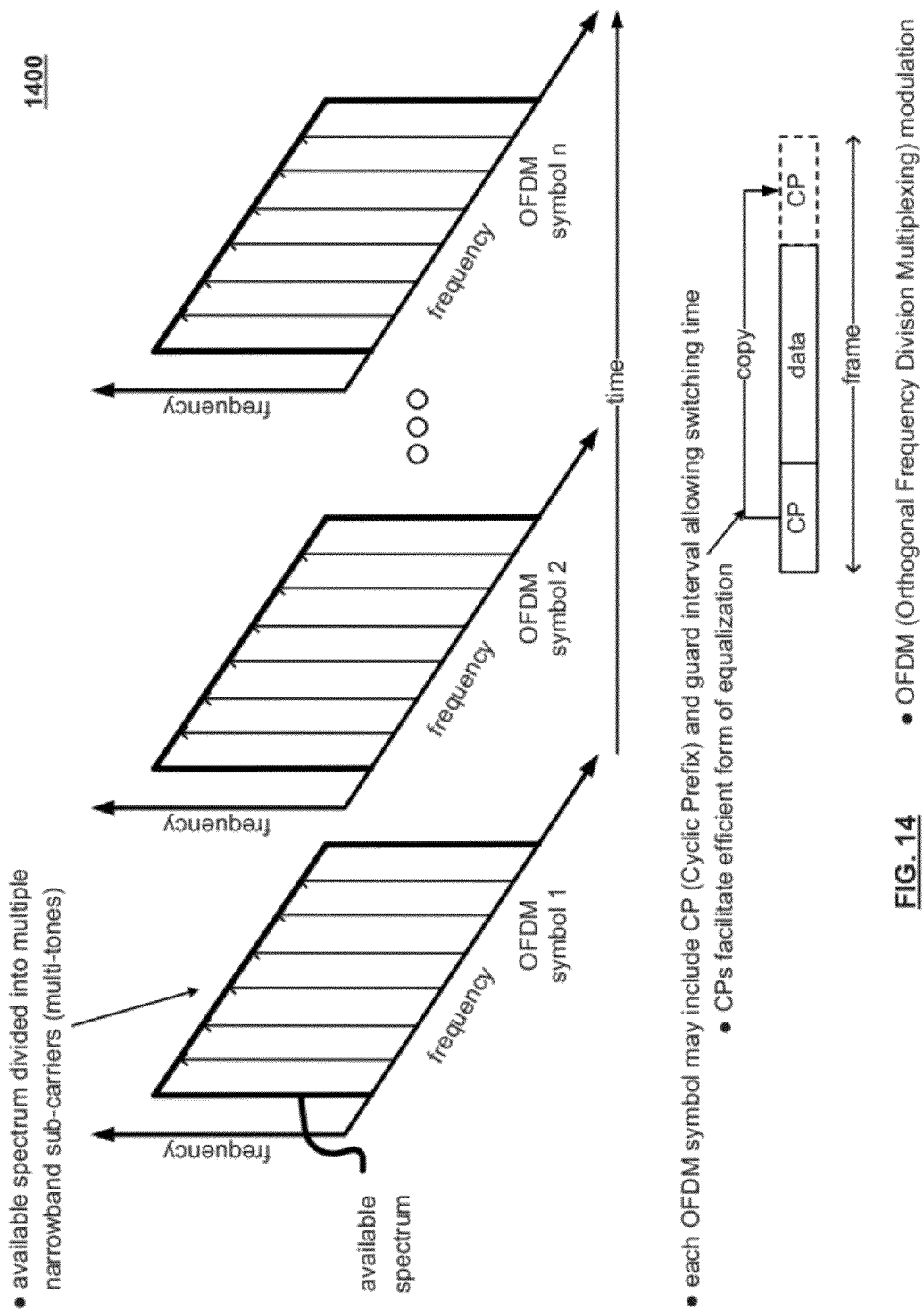
FIG. 14 illustrates an embodiment of OFDM (Orthogonal Frequency Division Multiplexing).

FIG. 14 illustrates an embodiment 1400 of OFDM (Orthogonal Frequency Division Multiplexing). OFDM modulation may be viewed a dividing up an available spectrum into a plurality of (narrowband) tones or sub-carriers (e.g., lower data rate tones or carriers). Typically, the frequency responses of these sub-carriers are overlapping and orthogonal. Each tone or sub-carrier may be modulated using any of a variety of modulation coding techniques.

OFDM modulation operates by performing simultaneous transmission of a larger number of (narrowband) tones or sub-carriers (or multi-tones). Oftentimes a guard interval (GI) or guard space is also employed between the various OFDM symbols to try to minimize the effects of ISI (Inter-Symbol Interference) that may be caused by the effects of multi-path within the communication system (which can be particularly of concern in wireless communication systems). In addition, a CP (Cyclic Prefix) may also be employed within the guard interval to allow switching time (when jumping to a new band) and to help maintain orthogonality of the OFDM symbols. Generally speaking, OFDM system design is based on the expected delay spread within the communication system (e.g., the expected delay spread of the communication channel).

Herein, a novel preamble structure is presented that is suitable for a variety of operational modes including those applicable for single-user (SU) case, multi-user (MU) case, and a low Doppler/high Doppler case. For example, with respect to the low Doppler/high Doppler case, additional long training fields (LTFs) may be needed to assist in channel estimation, channel training, etc. If desired, a single bit may be included to indicate the high Doppler case. Such Doppler effects may be realized in situations in which a wireless communication device has a relatively high mobility (e.g., a wireless communication device being operated within a fast moving vehicle, on a train, etc.). In such a situation, multi-path effects and/or various reflections may deleteriously affect performance.

An indication of the preamble having a format corresponding to a high Doppler suitable packet may be provided by a bit (e.g., one bit) in the SIG-A or SIG-B field. For example, long training fields (LTFs) (and/or possibly short training fields (STFs)) may periodically be repeated after some number of orthogonal frequency division multiplexing (OFDM) DATA symbols in order to track the high Doppler channel. If desired, the LTFs may be repeated only for the SU case. For the MU case, repeated symbols may result in a significantly longer packet. In addition, MU transmissions may be vulnerable to high Doppler (e.g., increased inter-user interference). Rotation of the pilot symbols may be made over different positions within a packet or a communication. A high Doppler bit may not necessarily be included in which case there are two possibilities: (1) high Doppler suitable packet as default, and (2) no high Doppler provision in the packet as default.

In addition, there may be some indication before the Signal field (SIG-A) that would indicate one of the two (or more) modulation coding set (MCS) possibilities of SIG-A and/or a second Signal field (SIG-B). This indication may be in the short training field (STF) and/or within the long training field (LTF). The indication may be related to field content, inverted polarity, and/or phase shifts.

With respect to the lower frequency, narrowband channel, and longer range applications associated with the currently developing IEEE 802.11ah standard (e.g., in accordance with the Task Group TGah), it may be desirable to construct relatively shorter preambles (as opposed relatively long fields being employed within the preambles thereof). As such, novel approaches are presented herein by which the preamble may be shortened such as in accordance with the construction of the STF and/or LTF fields therein.

For example, bits start to appear in a packet within the signal field (SIG-A) to indicate information related to the packet. However, herein, additional information may be provided even before those bits related to the signal field (SIG-A) begin to appear (e.g., such as in accordance with what may be viewed as being an encrypted pre-SIG-A field). That is to say, even if the MCS of SIG-A is specified (e.g., usually as being a relatively lowest order so that all wireless communication devices can properly receive, demodulate, decode, etc. at least the SIG-A of the packet), but some means of communicating such information can be provided changing some indication that the signal field (SIG-A) is not of that default MCS (e.g., by effectuating at least one phase shift, and/or at least one polarity shift, etc.) because up to and before the SIG-A field, there are no bits there to indicate such. A change may be effectuated for certain properties of the signal corresponding to these proportions of the signal to indicate what is happening later in the field (e.g., such as in accordance with an encrypted pre-SIG-A field as may be effectuated by these at least one phase shift, and/or at least one polarity shift, etc.).

Figure 15:
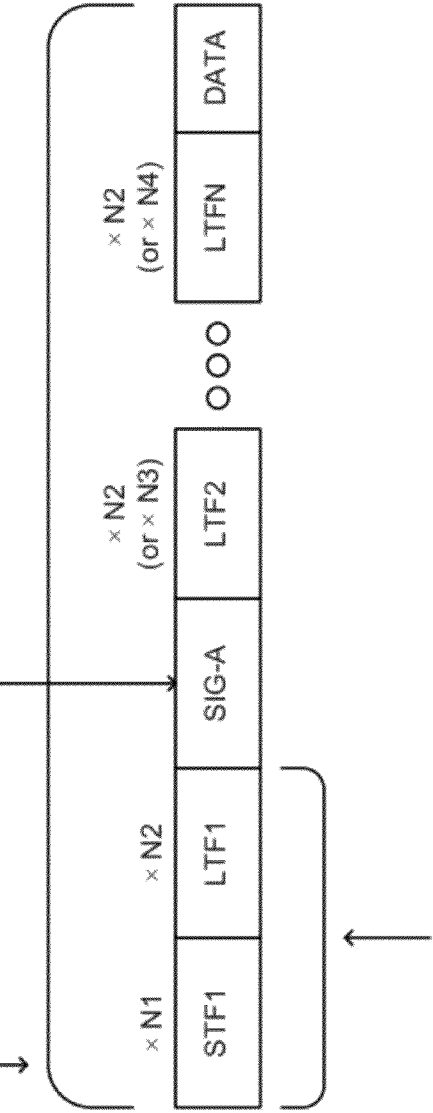
FIG. 15 illustrates an embodiment of a preamble for use in packetized communications for single-user (SU) applications.

FIG. 15 illustrates an embodiment 1500 of a preamble for use in packetized communications for single-user (SU) applications. This embodiment 1500 may be viewed as being a SU Case Option 1. As may be seen, transmit beamforming weights may be applied at the beginning of the packet.

Figure 16:
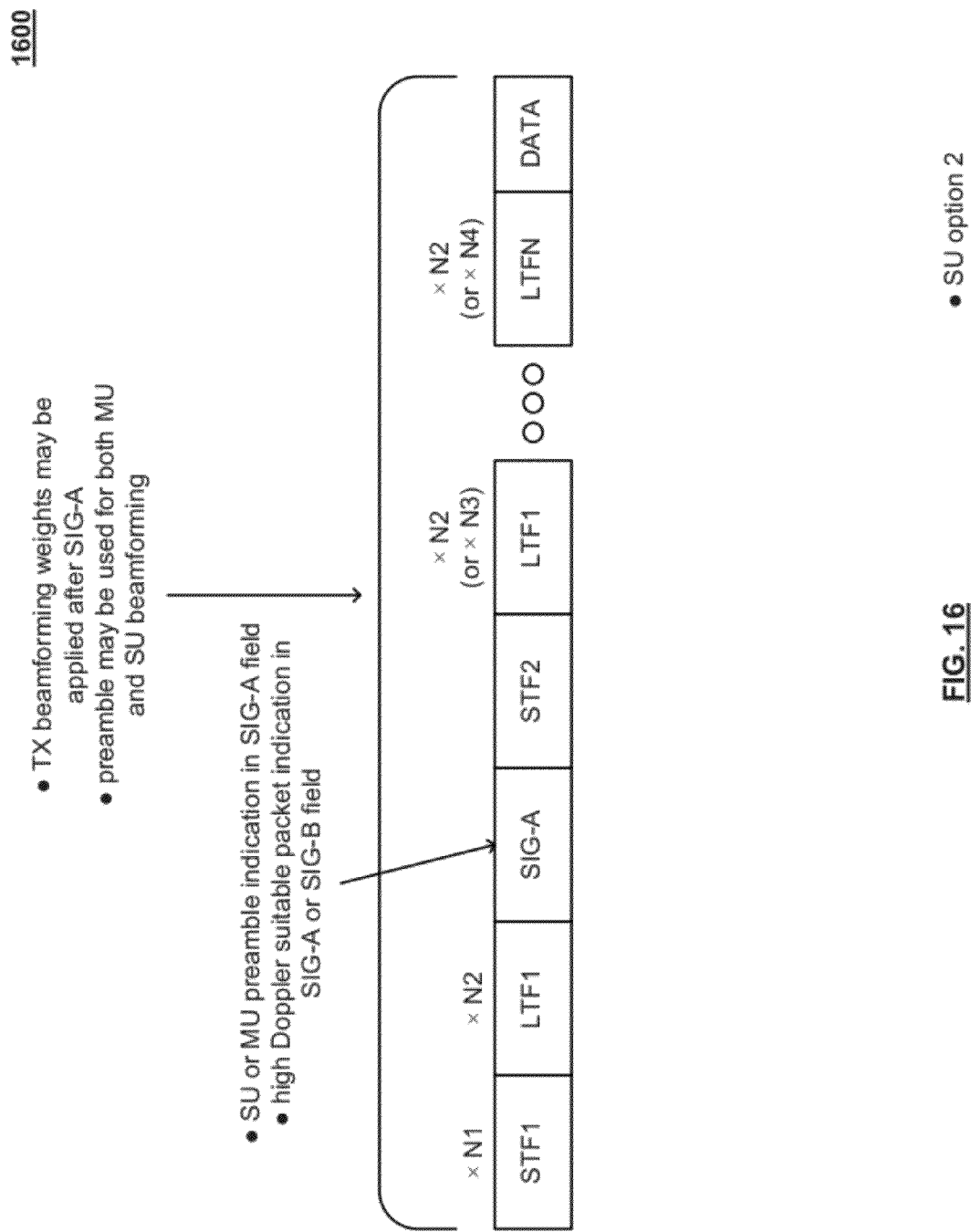
FIG. 16 illustrates an alternative embodiment of a preamble for use in packetized communications for SU applications.

FIG. 16 illustrates an alternative embodiment 1600 of a preamble for use in packetized communications for SU applications. This embodiment 1600 may be viewed as being a SU Case Option 2. As may be seen, transmit beamforming weights may be applied after the signal field (SIG-A).

Figure 17:
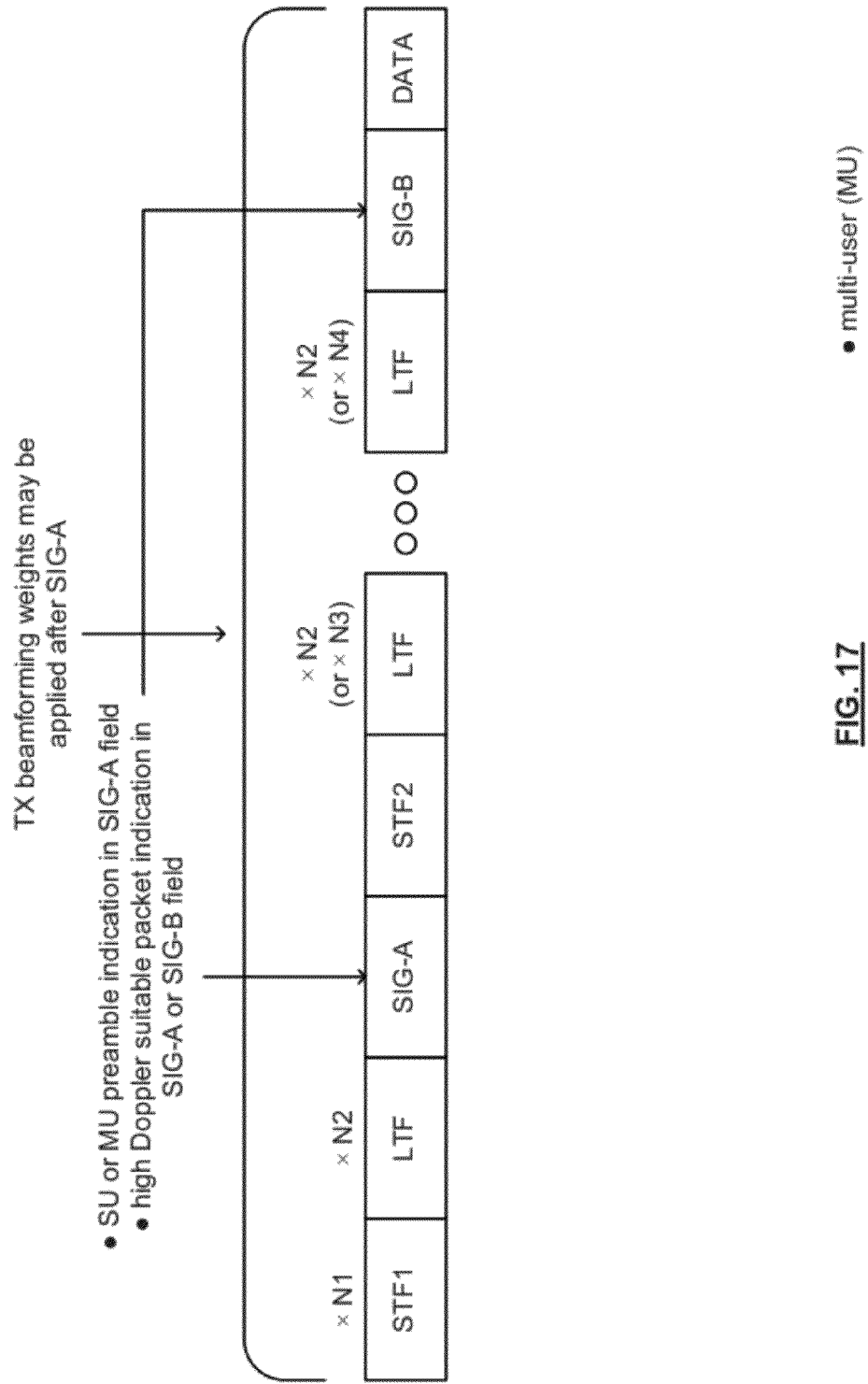
FIG. 17 illustrates an embodiment of a preamble for use in packetized communications for multi-user (MU) applications.

FIG. 17 illustrates an embodiment 1600 of a preamble for use in packetized communications for multi-user (MU) applications. This embodiment 1700 may be viewed as being a MU Preamble Case.

As may be seen, beamforming (precoding) may be applied after the signal field (SIG-A). The preamble structure may be used for both the MU Beamforming and SU Beamforming cases. The indicia of N1, N2 (and/or N3, N4) indicate that symbols may be repeated by a different number of repetitions (e.g., any integer between 1-4 in one embodiment).

A preamble structure such as may be suitable for the currently developing IEEE 802.11ah standard may have some attributes that are analogous to that which is compliant with IEEE 802.11ac. For example, the signal field (SIG-A) may be implemented to include bits that must be seen by all users and uses the lowest MCS in the system (e.g., lower order modulation, lower code rate, etc.) so that all wireless communication devices can receive, demodulate, decode, etc. at least that portion of the packet. Also, the second signal field (SIG-B) may be implemented to include bits that are user specific.

However, a preamble structure such as may be suitable for the currently developing IEEE 802.11ah standard may have other attributes that are different and particularly suited for such lower frequency, narrowband channel, and longer range applications. For example, the signal field (SIG-A) may be implemented to include bits that may signal the MCS used for Data and the MCS used for the second signal field (SIG-B). In an embodiment in which the Data MCS and SIG-B MCSs are different, a delta (difference, such as A) between the two MCSs may be signaled in the signal field (SIG-A). For example, the signal field (SIG-A) may signal the MCS used for the second signal field (SIG-B) and the second signal field (SIG-B) then signals the MCS used for DATA. That is to say, the signal field (SIG-A) may indicate within the MCS for each of the separate and respective different, following fields.

Alternatively, the signal field (SIG-A) may indicate a $\Delta$MCS (e.g., a difference based on at least one additional MCS) such that the $\Delta$MCS is with respect to the MCS of the second signal field (SIG-B) so that the MCS of the second signal field (SIG-B) and the $\Delta$MCS may be used for properly processing the DATA.

A variety of preamble combinations (e.g., from among 5 rep combinations) may be chosen. For example, the signal field (SIG-A) may contain 1 or 2 bits (or a series or group of bits) may be implemented to provide indication for different preamble types and/or types of transmissions (e.g., MU, SU Open Loop, SU Beamforming).

With respect to these various combinations, it is submitted that at least one column (such as with respect to FIG. 18 referenced below) would be selected, and then, based on that selected column, the preamble format will be specified as a function of the type of transmission.

Combination #1:
SU Option 1 may be used for both SU Beamforming and SU Open loop
MU preamble may be used for MU transmissions
Two preamble types Combination #2:
SU Option 2 may be used for both SU Beamforming and SU Open loop
MU preamble may be used for MU transmissions
Two preamble types Combination #3:
SU Option 1 may be used for Open Loop SU transmissions only
SU Option 2 in that case may be used for SU Beamforming (Closed Loop) transmissions
MU preamble may be used for MU transmissions
Three preamble types Combination #4:
SU Option 1 may be used for Open Loop SU transmissions only
MU preamble may be used for both SU Beamforming and MU case
In the SU Beamforming case SIG-B may not be relevant, it may be ignored
Two preamble types Combination #5:
To reduce the implementation complexity, only MU preamble may be selected for SU (Open Loop and Beamforming) and MU transmissions
Single preamble type
SIG-A indicates SU or MU transmission case With respect to the STF1 field indicated in the beginning of the packet, the STF1 field may be implemented in accordance with power boosting when compared to the other fields of the packet. The increased power may provide for better packet detection, timing and synchronization.

In some embodiments, the STF2 field may be considerably shorter than the STF1 field since it is used for automatic gain control (AGC) and/or AGC estimation, which can be coarse. For example, in accordance with IEEE 802.11a/n/ac, there are 10 short repetitions of 0.8 μs in the STF. In accordance with one embodiment that may be employed within the currently developing IEEE 802.11ah standard, one or two short repetitions may be used only. However, in accordance with the currently developing IEEE 802.11ah standard, each repetition may be longer because of the bandwidth scaling (down-clocking).

It is noted that the STF2 field may not be present in all embodiments. For example, a cyclic prefix of the next orthogonal frequency division multiplexing (OFDM) symbol may be used for automatic gain control (AGC) and/or AGC estimation. In some situations, the cyclic prefix can be longer than in other embodiments.

Figure 18:
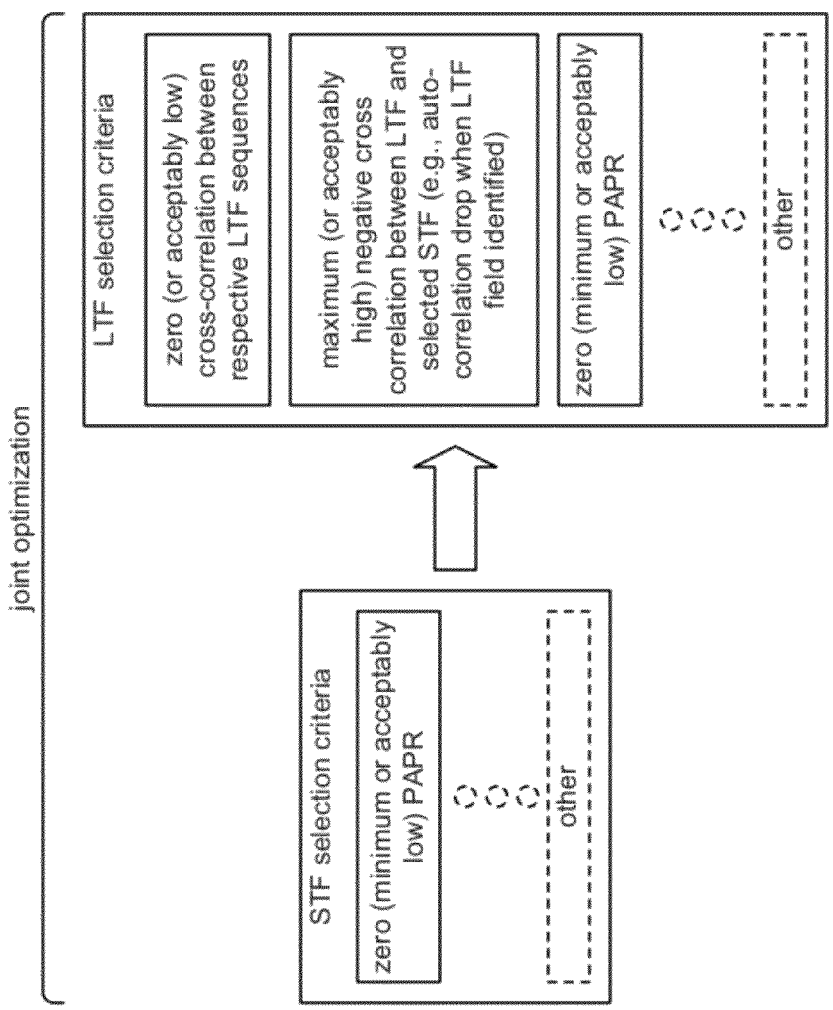
FIG. 18 illustrates an embodiment of design criteria employed in accordance with joint optimization of long training field (LTF) and short training field (STF) sequences based on one or more parameters.

FIG. 18 illustrates an embodiment 1800 of design criteria employed in accordance with joint optimization of long training field (LTF) and short training field (STF) sequences based on one or more parameters. In certain prior embodiments and/or diagrams, design of respective LTF sequences and STF sequences have been made independently with respect to one another. That is to say, design of certain LTF sequences have been made independently with respect to STF sequences, and vice versa. In this embodiment 3700 and others, joint optimization of LTF and STF sequences (e.g., 32 FFT LTF and STF sequences) is made based upon consideration of one or more parameters jointly affecting and trading off between the respective LTF and STF sequences. For example, in the process of performing timing acquisition, a receiver communication device may be implemented to lock on to the STF sequence and then to use the fact that the LTF sequence is different, to a certain or acceptable degree with respect to the STF sequence, in order to detect the start of the LTF field within a received signal and therefore identify the beginning of the packet. It is noted that the LTF field may be used for channel estimation, and such channel estimation operations generally perceived packet decoding. Generally speaking, the distinctions and characteristics that differentiate the STF sequence and the LTF sequence may be used to detect the start of the LTF field and consequently the start of the packet.

As such, herein, jointly designed LTF and STF sequences may be made such that a receiver communication device can better benefit in the acquisition process. For example, in accordance with using an STF sequence having a relatively lowest, or acceptably low, peak average power ratio (PAPR), then an appropriately selected LTF sequence may be made based upon one or more additional criteria. As may be understood, there is joint optimization and consideration in designing and selecting respective LTF and STF sequences. Again, rather than design the respective LTR sequences and STF sequences independently with respect to one another, joint consideration is made between them which may also involve making one or more trade-offs between the one or more respective design criteria.

In accordance with one possible embodiment of joint optimization of an LTF and STF sequence, such as particularly directed towards 32 FFT LTF and STF sequences, and STF sequence may be initially selected. Any one or more criteria may be employed in accordance with selecting a candidate STF sequence.

In one embodiment, an STF sequence particularly tailored for operation in accordance with IEEE 802.11ah developing standard, recommended practices, etc. having a PAPR of 0.45 dB may be selected as a candidate STF sequence. Then, joint optimization in accordance with selecting an LTF sequence based upon the candidate STF sequence may be performed based upon one or more design criteria.

For example, one particular design criterion may be to ensure zero, or an acceptably low valued, cross-correlation between each respective candidate LTF sequence and the 64 FFT LTF sequence. Of course, it may be very difficult to ensure exactly zero (0) cross-correlation value, but a cross-correlation value having a relatively low or acceptably low value between each respective candidate LTF sequence and the 64 FFT LTF sequence. Such a cross-correlation value may be specified particularly in accordance with the metric described with respect to ensuring that the 32 FFT LTF sequence and the 64 FFT LTF sequence are orthogonal with respect to one another at least with respect to one of the following considerations and/or metrics:

$$\sum_k p_{32}(k) p_{32}(k+1)^* p_{64U}(k) p_{64U}(k+1)^* = 0$$

$$\sum_k p_{32}(k) p_{32}(k+1)^* p_{64D}(k) p_{64D}(k+1)^* = 0$$

Also, it is noted that a relatively higher cross-correlation value may be allowed in trade-off if one or more other constraints may not be able to be met. For example, a designer is given a wide degree of latitude in allowing movement of one parameter at the expense of or in reaction to another parameter.

In addition, a maximum or relatively high (to an acceptable degree), negative cross-correlation between the candidate STF sequence and an LTF sequence may be another design criterion. For example, based upon the candidate STF, and appropriately selected LTF sequence may be made such that the negative cross-correlation there between will allow for a relatively quick drop of the auto-correlation metric. Such negative cross-correlation between the candidate STF sequence and an appropriately selected LTF sequence can allow for better detection of the start of the LTF field and therefore the start of the packet.

Yet another design criterion may be associated with insuring that 0 dB (e.g., minimum or relatively low (to an acceptable degree, if not specifically 0 dB)) peak to average power ratio (PAPR) is achieved. For example, in accordance with IEEE 802.11ah developing standard, recommended practices, etc., a relatively low PAPR can also mean a relatively low PAPR of a sequence with flipped polarity in the pilot locations of the LTF. Because of these properties, the two respective numbers may be checked with respect to one another. In certain situations, PAPR values lower than approximately 6 dB may be viewed as being acceptable sent the data PAPR made generally be in the range around approximately 9 dB. Of course, it is noted that various trade-off considerations may be made with respect to these various design criteria, parameters, constraints, etc. (e.g., cross-correlation, PAPR, auto-correlation drop [rate thereof], etc.).

Figure 19:
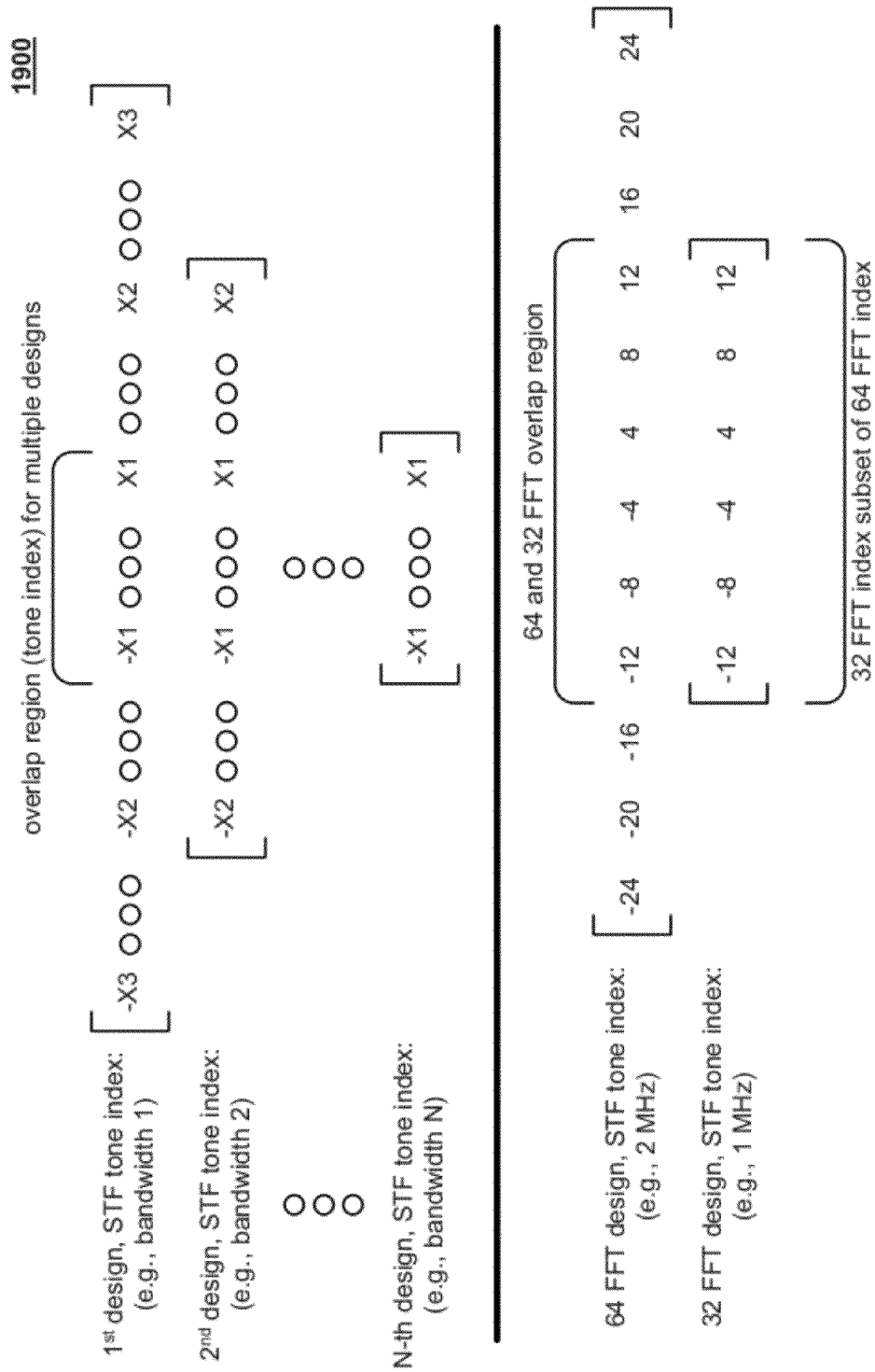
FIG. 19 illustrates an embodiment of two or more STF sequences for different respective packet types.

FIG. 19 illustrates an embodiment 1900 of two or more STF sequences for different respective packet types. As may be seen with respect to the top portion of this diagram, a number of different respective STF tone indices may be employed. Generally speaking, and overlap region of at least some of the STF tone indices may be common to all of the respective STF tone index designs. For example, while each respective STF tone index design may correspond to a different respective channel bandwidth, there may be some commonality or overlap between the respective STF tone index designs.

For example, considering an exemplary embodiment of an appropriate 32 FFT STF tone index design directed towards a channel bandwidth of 1 MHz (e.g., as shown at the bottom portion of this diagram), certain of the STF tone indices are common also to a 32 FFT STF tone index design directed towards a channel bandwidth of 2 MHz. As such, two or more STF sequences for different respective operational modes (e.g., different respective packet types, different respective channel bandwidth, etc.) may be employed such that there is some overlap or commonality between the tone indices thereof. In addition, as described elsewhere herein with respect to the particular values associated with the respective STF tone indices, the power may be tapered at the edges of each respective STF design. As such, a relatively low peak to average power ratio (PAPR) may be achieved so that such an STF may undergo appropriate boosting without deleteriously affecting a communication devices operation (e.g., such as avoiding any clipping, saturation, etc. of a power amplifier within a front end of a communication device). By using appropriately designed tone indices and values for those respective indices (e.g., selected appropriately such that the respective power of the tone indices near the edges of the STF tone index are relatively lower than the power associated with the tone indices centrally located within the STF tone index), a very low PAPR may be achieved to assist in providing for more optimal communication device operation. Such a tone index can include edge tone power relatively lower than central tone power such that magnitude of edge tone values are one-half the magnitude of central tone values. The tone indices can include [−12:4:−4, 4:4:12] or [−12 −8 −4 4 8 12], and also note also that a given STF sequence may be implemented to have every $4^{th}$ tone modulated (e.g., such as with respect to the example in the bottom of FIG. 19).

In addition, by having appropriate STF tone index designs having such similarity, such as with respect to the particular STF tone indices therein, a given communication device may be operative to perform receipt and processing of any of a number of different signal types corresponding to different operational modes (e.g., a given communication device may then be operative to receive and process a given signal regardless of the particular signal type to which it corresponds). That is to say, considering an embodiment in which a signal may correspond to a channel bandwidth of 1 MHz or 2 MHz, a singular communication device may be operative to perform receipt and processing of a signal complying with either of those channel bandwidth operational modes.

Figure 20:
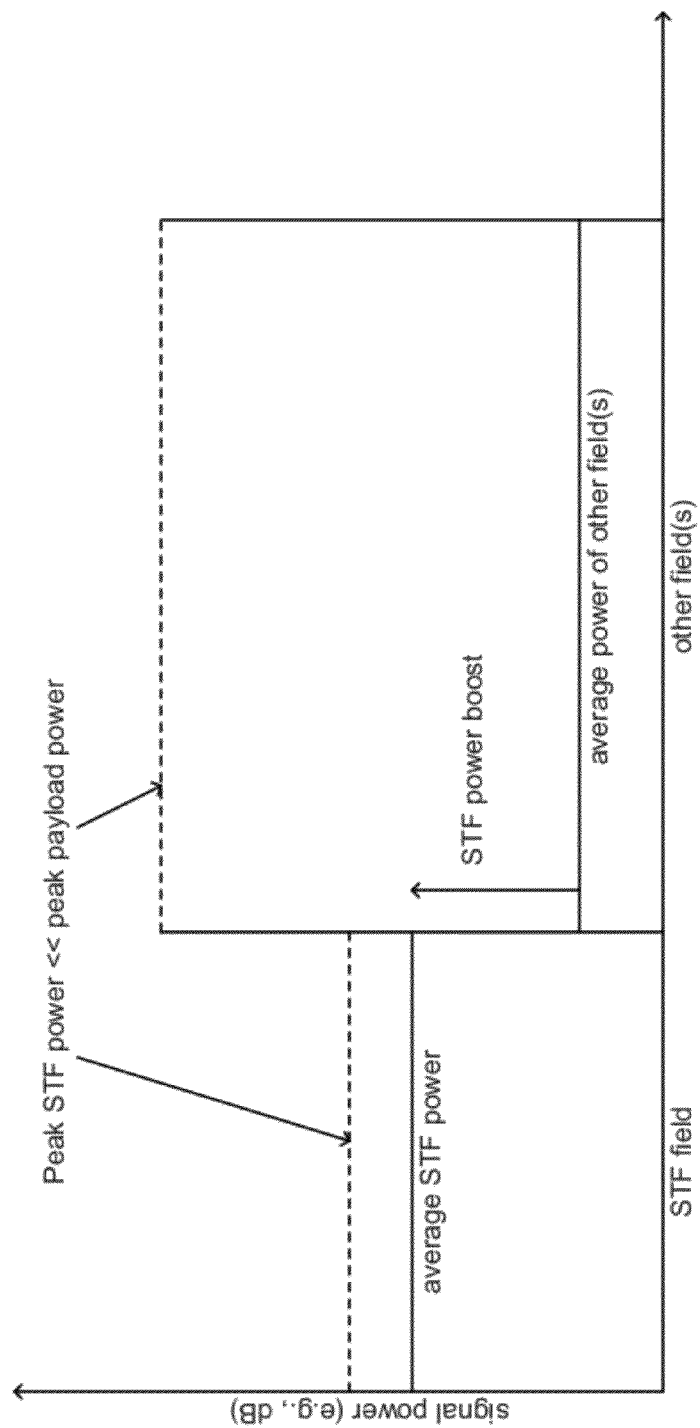
FIG. 20 illustrates an embodiment of STF power boosting and relative average power, peak power, etc. between one implementation of STF and other field(s) within a packet or signal.

FIG. 20 illustrates an embodiment 2000 of STF power boosting and relative average power, peak power, etc. between one implementation of STF and other field(s) within a packet or signal. Having an appropriately designed STF tone index (e.g., such as having a tapered power profile such that the relative power near the edges of the STF tone index are relatively lower than the power within the middle of the STF tone index) will allow for the potentiality of STF boosting without introducing other deleterious problems (e.g., such as clipping within a power amplifier within a front end of the communication device). As may be seen with respect to this diagram, having such an appropriately designed STF can ensure that the average STF power is relatively close to the peak STF power, thereby providing a relatively low PAPR. In the instance in which STF power boost is performed, the overall operation of the communication device will suffer very little, if any, degradation.

Figure 21:
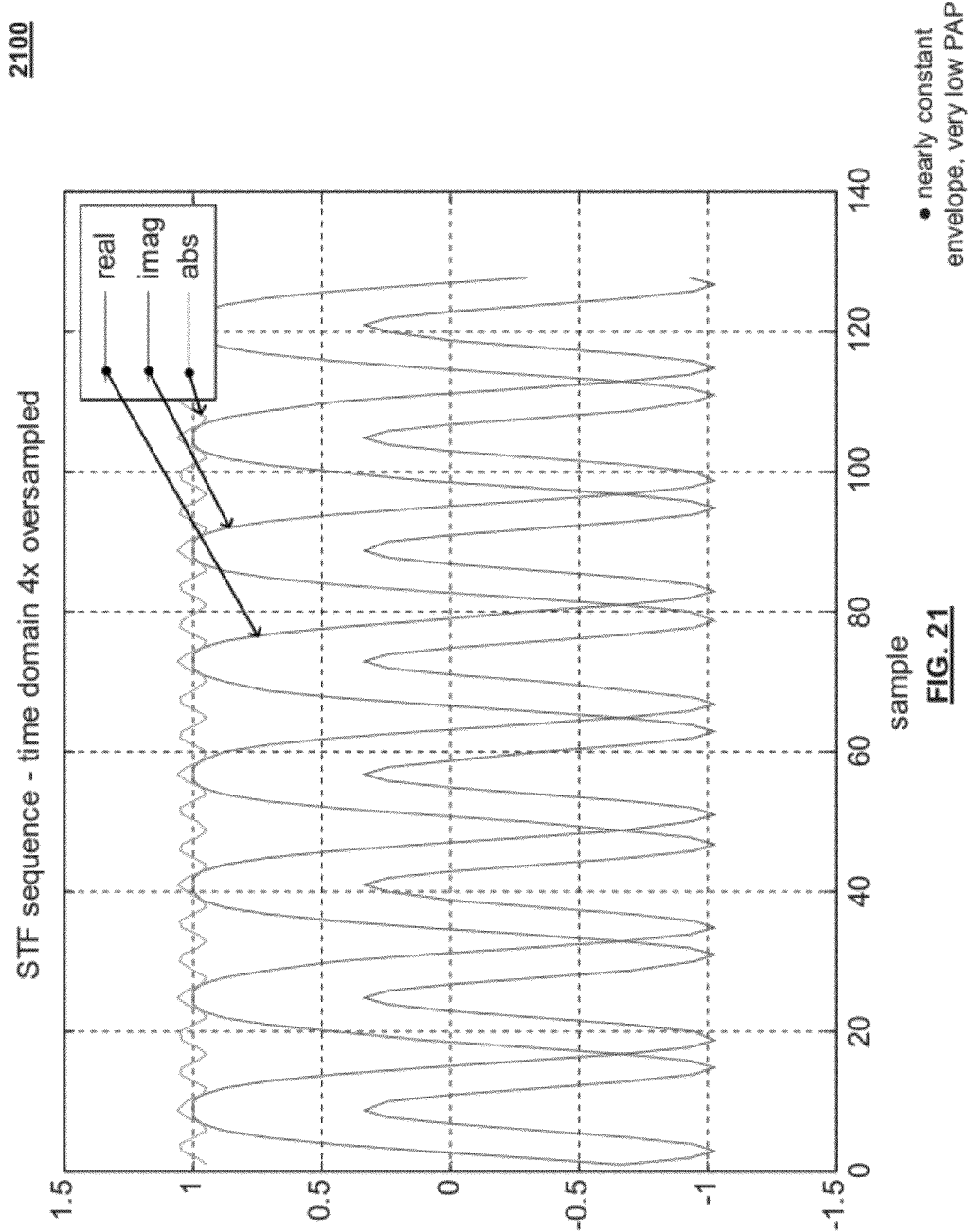
FIG. 21 illustrates an embodiment of an STF showing a nearly constant envelope with very low peak to average power ratio (PAPR).

FIG. 21 illustrates an embodiment 2100 of an STF showing a nearly constant envelope with very low peak to average power ratio (PAPR). This diagram also shows that the envelope of the STF sequence portion of the signal has almost a constant power.

FIG. 22 illustrates an embodiment of a method 2200 for operating one or more wireless communication devices.

Referring to method 2200 of FIG. 22, the method 2200 begins by selectively generating a packet having a selected packet type of a plurality of packet types, as shown in a block 2210. In some situations, with respect to the method 2200, each of the plurality of packet types has a respective short training field (STF) sequence with a respective peak to average power ratio (PAPR) less than a threshold and having a respective tone index with edge tone power relatively lower than central tone power as may be seen with respect to block 2212.

Via at least one antenna of a communication device, the method 2200 continues by transmitting a signal corresponding to the packet to at least one additional communication device, as shown in a block 2220.

In certain embodiments, a variant of the method 2200 may also operate by operating a physical layer (PHY) of the communication device to support communications with the at least one additional communication device in accordance with a plurality of channel bandwidths such that each of the plurality of packet types respectively corresponding to a respective one of the plurality of channel bandwidths (e.g., such as corresponding to 1 MHz and 2 MHz in one embodiment).

It is also noted that the various operations and functions as described with respect to various methods herein may be performed within a wireless communication device, such as using a baseband processing module and/or a processing module implemented therein, (e.g., such as in accordance with the baseband processing module 64 and/or the processing module 50 as described with reference to FIG. 2) and/or other components therein including one of more baseband processing modules, one or more media access control (MAC) layers, one or more physical layers (PHYs), and/or other components, etc. For example, such a baseband processing module can generate such signals and frames as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing to generate signals for transmission using at least one of any number of radios and at least one of any number of antennae to another wireless communication device (e.g., which also may include at least one of any number of radios and at least one of any number of antennae) in accordance with various aspects of the invention, and/or any other operations and functions as described herein, etc. or their respective equivalents. In some embodiments, such processing is performed cooperatively by a processing module in a first device, and a baseband processing module within a second device. In other embodiments, such processing is performed wholly by a baseband processing module or a processing module.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

Mode Selection Tables:

TABLE 1

| | | | | 2.4 GHz, 20/22 MHz channel BW, 54 Mbps max bit rate | | | | | |
|---|---|---|---|---|---|---|---|---|---|
| Rate | Modulation | Code Rate | NBPSC | NCBPS | NDBPS | EVM | Sensitivity | ACR | AACR |
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A wireless communication device comprising:
    a communication interface; and
    a processor, the processor and the communication interface configured to:
        support orthogonal frequency division multiplexing (OFDM) communications with another wireless communication device using any of a plurality of packet types corresponding to a plurality of channel bandwidths;
        generate, when supporting OFDM communications based on a relatively most narrow channel bandwidth of the plurality of channel bandwidths, an OFDMA packet including to:
            boost magnitude of first data within sub-carriers of a short training field (STF) of the OFDMA packet relative to second data within sub-carriers of other fields of the OFDMA packet to generate a boosted STF of the OFDMA packet; and
            reduce magnitude of a first subset of the first data within two sub-carriers located at a first edge and a second edge of the boosted STF relative to a second subset of the first data within sub-carriers located between the two sub-carriers located at the first edge and the second edge of the boosted STF based on a tapered power profile; and
        transmit the OFDMA packet to the another wireless communication device.

2. The wireless communication device of claim 1, wherein the plurality of channel bandwidths includes a 1 MHz channel bandwidth and a 2 MHz channel bandwidth, and the relatively most narrow channel bandwidth of the plurality of channel bandwidths is the 1 MHz channel bandwidth.

3. The wireless communication device of claim 1, wherein the STF of the OFDMA packet includes every $4^{th}$ sub-carrier modulated and includes a plurality of sub-carriers having indices of [−12:4:−4, 4:4:12] or [−12 −8 −4 4 8 12].

4. The wireless communication device of claim 1, wherein:
the plurality of channel bandwidths includes a 1 MHz channel bandwidth and a 2 MHz channel bandwidth; and
the relatively most narrow channel bandwidth of the plurality of channel bandwidths is the 1 MHz channel bandwidth; and
the STF of the OFDMA packet that is based on the 1 MHz channel bandwidth includes every $4^{th}$ sub-carrier modulated and includes a first plurality of sub-carriers having indices of [−12:4:−4, 4:4:12] or [−12 −8 −4 4 8 12] that is a subset of a second plurality of sub-carriers associated with the 2 MHz channel bandwidth.

5. The wireless communication device of claim 1, wherein the processor and the communication interface are further configured to:
reduce the magnitude of the first subset of the first data within the two sub-carriers located at the first edge and the second edge of the boosted STF by a factor of one-half relative to the second subset of the first data within sub-carriers located between the two sub-carriers located at the first edge and the second edge of the boosted STF based on the tapered power profile.

6. The wireless communication device of claim 1, wherein the processor and the communication interface are further configured to:
reduce the magnitude of the first subset of the first data within the two sub-carriers located at the first edge and the second edge of the boosted STF by a factor of one-half relative to the second subset of the first data within sub-carriers located between the two sub-carriers located at the first edge and the second edge of the boosted STF based on the tapered power profile to reduce peak to average power ratio (PAPR) of the boosted STF.

7. The wireless communication device of claim 1, wherein the processor and the communication interface are further configured to:
generate, when supporting OFDM communications based on a relatively most narrow channel bandwidth of the plurality of channel bandwidths, the OFDMA packet including to repeat the boosted STF within the OFDMA packet.

8. The wireless communication device of claim 1 further comprising:
a wireless station (STA), wherein the another wireless communication device is an access point (AP).

9. A wireless communication device comprising:
a communication interface; and
a processor, the processor and the communication interface configured to:
support orthogonal frequency division multiplexing (OFDM) communications with another wireless communication device using any of a plurality of packet types corresponding to a plurality of channel bandwidths that includes a 1 MHz channel bandwidth and a 2 MHz channel bandwidth;
generate, when supporting OFDM communications based on the 1 MHz channel bandwidth, an OFDMA packet including to:
boost magnitude of first data within sub-carriers of a short training field (STF) of the OFDMA packet relative to second data within sub-carriers of other fields of the OFDMA packet to generate a boosted STF of the OFDMA packet, wherein the STF includes every $4^{th}$ sub-carrier modulated; and
reduce magnitude of a first subset of the first data within two sub-carriers located at a first edge and a second edge of the boosted STF by a factor of one-half relative to a second subset of the first data within sub-carriers located between the two sub-carriers located at the first edge and the second edge of the boosted STF based on a tapered power profile to reduce peak to average power ratio (PAPR) of the boosted STF; and
transmit the OFDMA packet to the another wireless communication device.

10. The wireless communication device of claim 9, wherein:
the 1 MHz channel bandwidth is a relatively most narrow channel bandwidth of the plurality of channel bandwidths; and
the STF of the OFDMA packet that is based on the 1 MHz channel bandwidth includes every $4^{th}$ sub-carrier modulated and includes a first plurality of sub-carriers having indices of [−12:4:−4, 4:4:12] or [−12 −8 −4 4 8 12] that is a subset of a second plurality of sub-carriers associated with the 2 MHz channel bandwidth.

11. The wireless communication device of claim 9, wherein the processor and the communication interface are further configured to:
generate, when supporting OFDM communications based on the 2 MHz channel bandwidth, another OFDMA packet; and
transmit the another OFDMA packet to the another wireless communication device.

12. The wireless communication device of claim 9, wherein the processor and the communication interface are further configured to:
generate, when supporting OFDM communications based on a relatively most narrow channel bandwidth of the plurality of channel bandwidths, the OFDMA packet including to repeat the boosted STF within the OFDMA packet.

13. The wireless communication device of claim 9 further comprising:
a wireless station (STA), wherein the another wireless communication device is an access point (AP).

14. A method for execution by a wireless communication device, the method comprising:
supporting, via a communication interface of the wireless communication device, orthogonal frequency division multiplexing (OFDM) communications with another wireless communication device using any of a plurality of packet types corresponding to a plurality of channel bandwidths;
generating, when supporting OFDM communications based on a relatively most narrow channel bandwidth of the plurality of channel bandwidths, an OFDMA packet including:
boosting magnitude of first data within sub-carriers of a short training field (STF) of the OFDMA packet relative to second data within sub-carriers of other fields of the OFDMA packet to generate a boosted STF of the OFDMA packet; and
reducing magnitude of a first subset of the first data within two sub-carriers located at a first edge and a second edge of the boosted STF relative to a second subset of the first data within sub-carriers located between the two sub-carriers located at the first edge and the second edge of the boosted STF based on a tapered power profile; and transmitting, via the communication interface of the wireless communication device, the OFDMA packet to the another wireless communication device.

15. The method of claim 14, wherein the plurality of channel bandwidths includes a 1 MHz channel bandwidth and a 2 MHz channel bandwidth, and the relatively most narrow channel bandwidth of the plurality of channel bandwidths is the 1 MHz channel bandwidth.

16. The method of claim 14, wherein:
the plurality of channel bandwidths includes a 1 MHz channel bandwidth and a 2 MHz channel bandwidth; and
the relatively most narrow channel bandwidth of the plurality of channel bandwidths is the 1 MHz channel bandwidth; and
the STF of the OFDMA packet that is based on the 1 MHz channel bandwidth includes every $4^{th}$ sub-carrier modulated and includes a first plurality of sub-carriers having indices of [−12:4:−4, 4:4:12] or [−12 −8 −4 4 8 12] that is a subset of a second plurality of sub-carriers associated with the 2 MHz channel bandwidth.

17. The method of claim 14 further comprising:
reducing the magnitude of the first subset of the first data within the two sub-carriers located at the first edge and the second edge of the boosted STF by a factor of one-half relative to the second subset of the first data within sub-carriers located between the two sub-carriers located at the first edge and the second edge of the boosted STF based on the tapered power profile to reduce peak to average power ratio (PAPR) of the boosted STF.

18. The method of claim 14 further comprising:
generating, when supporting OFDM communications based on a relatively most narrow channel bandwidth of the plurality of channel bandwidths, the OFDMA packet including to repeat the boosted STF within the OFDMA packet.

19. The method of claim 14, wherein the plurality of channel bandwidths includes a 1 MHz channel bandwidth and a 2 MHz channel bandwidth, and the relatively most narrow channel bandwidth of the plurality of channel bandwidths is the 1 MHz channel bandwidth; and further comprising:
generating, when supporting OFDM communications based on the 2 MHz channel bandwidth, another OFDMA packet; and
transmitting, via the communication interface of the wireless communication device, the another OFDMA packet to the another wireless communication device.

20. The method of claim 14, wherein the wireless communication device is a wireless station (STA), and the another wireless communication device is an access point (AP).

* * * * *